United States Patent [19]

Funawatari et al.

[11] Patent Number: 5,671,590
[45] Date of Patent: Sep. 30, 1997

[54] CASING FOR HOUSING DISC CARTRIDGE AND METHOD FOR PACKAGING THE CASING

[75] Inventors: Takatsugu Funawatari; Masaei Fukaya; Hiroyuki Honma, all of Miyagi, Japan

[73] Assignee: Sony Corporation, Tokyo, Japan

[21] Appl. No.: 390,101

[22] Filed: Feb. 17, 1995

Related U.S. Application Data

[62] Division of Ser. No. 277,783, Jul. 20, 1994, Pat. No. 5,450,952, which is a continuation of Ser. No. 36,626, Mar. 24, 1993, abandoned.

[30] Foreign Application Priority Data

| Mar. 31, 1992 | [JP] | Japan | 4-103958 |
| Mar. 31, 1992 | [JP] | Japan | 4-103959 |
| Mar. 31, 1992 | [JP] | Japan | 4-103960 |
| Mar. 31, 1992 | [JP] | Japan | 4-103965 |

[51] Int. Cl.⁶ ................................. B65B 53/02
[52] U.S. Cl. ........................ 53/442; 53/463; 53/477
[58] Field of Search .................. 53/442, 463, 477, 53/557, 370.7, 371.2, 375.9; 206/497

[56] References Cited

U.S. PATENT DOCUMENTS

| 2,289,747 | 7/1942 | Baker | 221/62 |
| 2,638,725 | 5/1953 | Harvey | 53/463 |
| 3,664,088 | 5/1972 | Sherman | 53/557 X |
| 3,808,767 | 5/1974 | Reid | 53/442 |
| 3,906,702 | 9/1975 | Yano | 53/442 X |
| 3,949,872 | 4/1976 | Paudras | 206/310 |
| 4,159,827 | 7/1979 | Torrington | 274/9 B |
| 4,266,784 | 5/1981 | Torrington | 369/77 |
| 4,413,732 | 11/1983 | Louzil | 206/387 |
| 4,463,849 | 8/1984 | Prusak et al. | 206/307 |
| 4,463,850 | 8/1984 | Gorog | 206/309 |
| 4,561,544 | 12/1985 | Reeve | 206/540 |
| 4,627,531 | 12/1986 | Clemens | 206/309 |
| 4,838,422 | 6/1989 | Gregerson | 206/444 |
| 4,867,311 | 9/1989 | Metcalf | 206/444 |
| 4,940,142 | 7/1990 | Behrens et al. | 206/444 |
| 4,986,415 | 1/1991 | Posso | 206/45.23 |
| 5,080,222 | 1/1992 | McNary | 206/1.5 |
| 5,121,380 | 6/1992 | Fujita et al. | 369/291 |
| 5,129,538 | 7/1992 | Bennett | 220/346 |
| 5,196,978 | 3/1993 | Washo et al. | 360/133 |
| 5,287,679 | 2/1994 | Dall'Omo | 53/375.9 X |

FOREIGN PATENT DOCUMENTS

| 0 286 987 A1 | 4/1988 | European Pat. Off. | G11B 33/04 |
| 0 490 671 A1 | 6/1992 | European Pat. Off. | G11B 23/02 |
| 0 564 155 A2 | 10/1993 | European Pat. Off. | G11B 33/04 |
| 2 238 211 | 6/1973 | France | G11B 23/04 |
| 23 37 310 | 6/1980 | Germany | A47F 3/00 |
| 1231352 | 5/1971 | United Kingdom | 53/442 |
| WO 86/07182 | 12/1986 | WIPO | G11B 23/02 |
| WO 90/05685 | 5/1990 | WIPO | B65D 85/30 |

*Primary Examiner*—Linda Johnson

[57] ABSTRACT

A casing for a disc cartridge includes first and second halves and a pair of holding means. The first half includes a plate portion, a pair of sidewall sections formed parallel to the parallel sides of the plate portion and a wall section between the sidewall sections. The second half includes a plate portion, a pair of sidewall sections formed parallel to the parallel sides of the plate portion and a wall section between the sidewall sections. Each of the sidewall sections is formed with a protrusion and a groove. The first and second halves are connected together by having the protrusion engaged in the groove. A holding unit is provided in an inner portion of the second half.

1 Claim, 34 Drawing Sheets

CASING FOR HOUSING DISC CARTRIDGE AND METHOD FOR PACKAGING THE CASING

This is a divisional of application Ser. No. 08/277,783, filed Jul. 20, 1994, now U.S. Pat. No. 5,450,952, issued on which was a file wrapper continuation of application Ser. No. 08/036,626, filed Mar. 24, 1993, now abandoned.

BACKGROUND OF THE INVENTION

This invention relates to a disc cartridge casing for packaging a disc cartridge comprised of a recording disc, such as an optical disc or a magneto-optical disc, contained in a main cartridge body. Note particularly, it relates to a sleeve casing for a disc cartridge and a method for packaging the sleeve casing with the disc cartridge therein.

A so-called sleeve casing has been proposed as a casing for packaging the disc cartridge comprised of the recording disc and the cartridge main body housing the disc or a tape cassette comprised of a tape reel fitted with a recording tape and a cassette housing the tape reel therein.

The sleeve casing 401 is formed by a sheet-shaped member of a synthetic material, such as polypropylene (PP) or polyethylene terephthalate (PFT), bent into a box one side of which is opened at 404 to provide a pouch-shaped structure, as shown in FIG. 1. The above-mentioned cassette, having the recording medium housed therein, is introduced into and held within the sleeve casing 401 via the opening 404. In general, the sleeve casing 401 is of a size just large enough to accommodate the cassette having the recording medium therein to hold the cassette by the force of friction between the outer surface of the cassette and the inner surface of the sleeve casing. The sleeve casing 401 has cut-outs 402, 403 at forward ends of the major surfaces of the casing in continuation to the opening 404 for ease in taking out the cassette from the sleeve casing.

Meanwhile, since the sleeve casing is formed by bending a sheet-shaped member formed of paper or the synthetic resin, it can not be increased in thickness beyond a certain limit in order to retain its foldability, thus rendering it difficult to develop a sufficient toughness.

If the sleeve casing is used as a casing for holding a disc cartridge, the following problem arises. That is, if the casing for holding the disc cartridge therein is not of a sufficient toughness, the disc cartridge cannot be protected reliably. That is, if an external pressure is applied to the casing with the disc cartridge contained therein, the casing tends to be deformed easily. The result is the possible destruction or deformation of the disc cartridge contained in the casing under an external pressure. On the other hand, if plural disc cartridges contained in the respective casings be stacked one upon the other, the casings tend to be deformed under the weight of the overlying disc cartridges. The result is again the possible destruction or deformation of the disc cartridges.

Besides, the conventional sleeve casing for the disc cartridge are not provided with means for retaining the disc cartridge contained therein. Consequently, the disc cartridge tends to be disengaged out of the casing under shock or vibrations. If the disc cart, ridge be disengaged out of the casing while it is transported while being contained therein, there is a risk that the disc cartridge will fall on the floor or ground and be destroyed under the resulting shock.

Besides, since the disc cartridge is formed by bending a sheet-shaped material, the opening via which the cartridge main body is introduced into or taken out of the casing cannot be formed with ease to a predetermined shape in the casing. Besides, since the opening in the casing tends to be deformed, difficulties tend to be incurred in the operation of introducing the disc cartridge into the-casing.

As a solution to such problem, it may be contemplated to form the casing of two casing halves, that is a top plate member and a bottom plate member, similar to two halves of the cartridge main body, these two plate members being abutted and connected to each other to complete a casing. In such case, these members are cast integrally by injection molding without, the necessity of performing a bending or folding operation. The result, is that these plate members can not be formed of a sufficiently tough material.

However, if the two plate members of the casing be connected together by set screws, the two plate members become complicated in structure. Besides, since female screws need to be provided so as to clear the disc cartridge, the top and bottom plate members become bulky in size as compared to the disc cartridge.

If the top and bottom plate members are connected together by so-called ultrasonic welding, the surface region of the plate members tend to be damaged by propagation of ultrasonic waves to detract from the appearance of the casing which should be as neat as possible. On the other hand, ultrasonic welding tends to scrape fused ribs formed along the junction line of the top and bottom plate members to produce debris which then tends to be left within the casing to be intruded later into the inside of the disc cartridge so as to be deposited on the disc within the disc cartridge to render it impossible to record and/or reproduce signals satisfactorily. Besides, the top and bottom plate members thus connected together by ultrasonic welding tend to be detached from each other due to insufficient durability under high temperature high humidity conditions.

If the top and bottom plate members are connected together using an adhesive, it takes some time until curing of the adhesive so that prompt connection cannot be achieved. Besides, it becomes necessary to control the amount of application of the adhesive so that an excess amount of the adhesive is not extruded from the space between the two plate members, thus leading to a complicated operation. In addition, a troublesome adhesive control operation is required to prevent the an unused adhesive from being cured or to prevent the adhesive power from being lowered. The two plate members thus connected together by the adhesive tend to be detached from each other due to insufficient durability under high temperature high humidity conditions.

There may be occasions wherein the sleeve casing 401, shown in FIGS. 1 to 3, ready to be sold with a disc cartridge contained therein, is to be packaged with a film member of synthetic resin, such as an overlap film. This packaging is performed by so-called caramel wrapping in which a sleeve casing 401 is introduced into the inside of an overlap film which is connected at opposite sides. Both end faces of the overlap film are folded inwards to form superposed portions which are heat-welded together to complete the wrapping. The heat welding is carried out by applying a heated ironing member, such as a heated metal plate, on the superposed portions of the overlap film. The overlap film is subsequently heat shrunk so as to be tightly affixed to the outer surface of the sleeve casing 401.

Meanwhile, since the overlap film is ultimately heat shrunk into tight contact with the outer surface of the sleeve casing 401, if any irregularities are present on the surface of the overlap film, the overlap film tends to be creased around these irregularities.

These creases not only detract from the appearance of the casing but also tend to catch the finger of a person handling the casing to produce rupture or severance of the heat-welded portions.

Since the above-mentioned cut-outs 402, 403 are formed in the sleeve casing 401, the outer lateral surface of the casing presents a step when the cassette, such as a disc cartridge, is accommodated in the casing, as shown in FIGS. 2 and 3. That is, the major surfaces of the sleeve casing 401 present steps corresponding to the thickness of the casing as indicated by arrow d in FIG. 2. Besides, on the front side of the casing, there are formed ribs on both lateral sides of the cut-outs 402, 403 corresponding to the amount of projection of the major surfaces of the sleeve as indicated by arrow S in FIG. 3.

SUMMARY OF THE INVENTION

It is therefore an object of the present invention to provide a casing for a disc-cartridge which resolves the above-mentioned problems.

It is another object of the present invention to provide a casing for a disc cartridge exhibiting sufficient toughness.

It is a further object, of the present invention to provide a packaging method for the casing for the disc cartridge whereby creasing is not incurred in the wrapping material.

According to the present invention, there is provided a casing having first, and second halves and a pair of holding members. The first half includes a plate portion, a pair of sidewall members formed along the parallel sides of the plate portion, and a wall member provided between the sidewall members. Each of the side wall members is provided with a protrusion and a groove, and the first and second halves are connected together by engagement of the grooves and the protrusions of the first, and the second halves. The holding members are provided in the inner portion of the second half.

According to the present invention, there is also provided a packaging method for a casing having an opening and a cut-out formed from the opening in the side of the casing, comprising the steps of applying a sheet-shaped member covering at least said opening and said cut-out, applying a film in a tubular form so that superposed portions are formed on the lateral sides of the casing, and heating said superposed portions for fusing the ends of said film.

The basic arrangement of the casing of the present invention consists of connecting the first and second halves by engagement of the grooves and protrusions formed on the three sidewall sections and in opening the remaining sidewall when the first and second halves are connected together. The result is that the casing may be constructed of a material exhibiting sufficient toughness as in the casing for the disc cartridge.

By applying a sheet-shaped material to cover up the opening side and the cut-outs of the casing before covering the casing with an overlap film, the casing to be packaged presents a planar outer surface in its entirety. Creases may then be prevented from being produced in the film after completion of packaging.

DETAILED DESCRIPTION OF THE PREFERRED EMBODIMENTS

Figure 1:
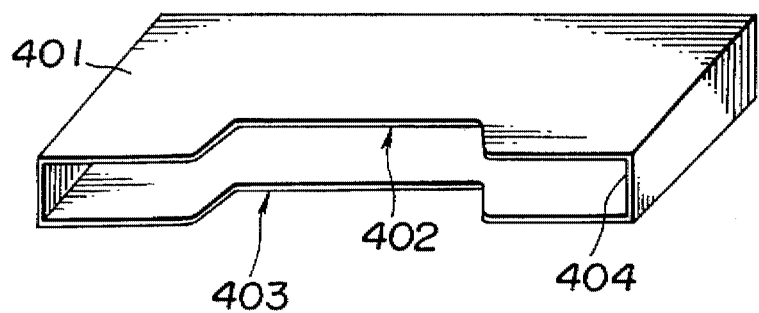
FIG. 1 is a perspective view showing the shape of a conventional sleeve casing.
Figure 2:
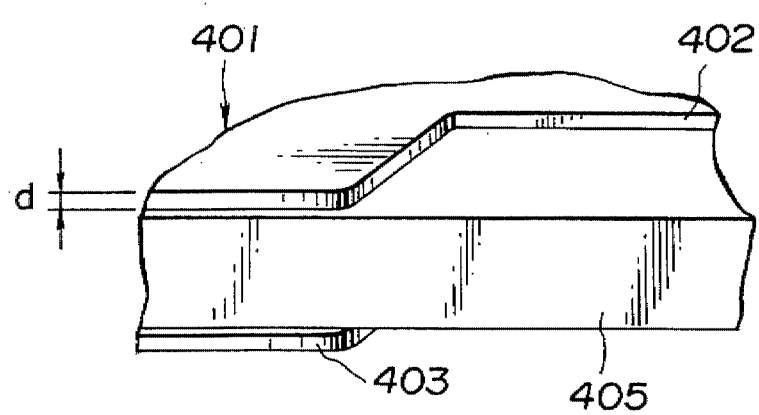
FIG. 2 is an enlarged partial perspective view showing irregularities on the outer lateral surface of the conventional sleeve casing shown in FIG. 1.
Figure 3:
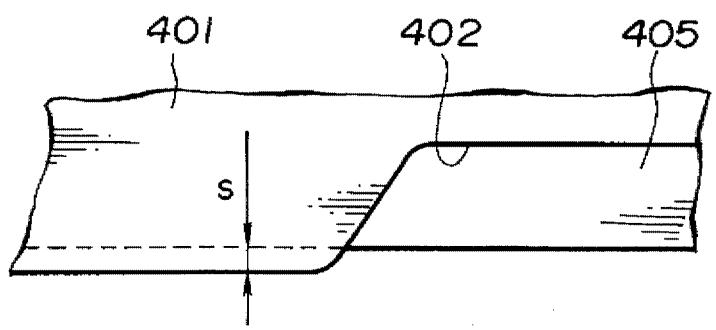
FIG. 3 is an enlarged partial plan view showing irregularities on the outer lateral surface of the conventional sleeve casing shown in FIG. 1.

Referring to the drawings, certain preferred embodiments of the present invention will be explained in detail.

Figure 4:
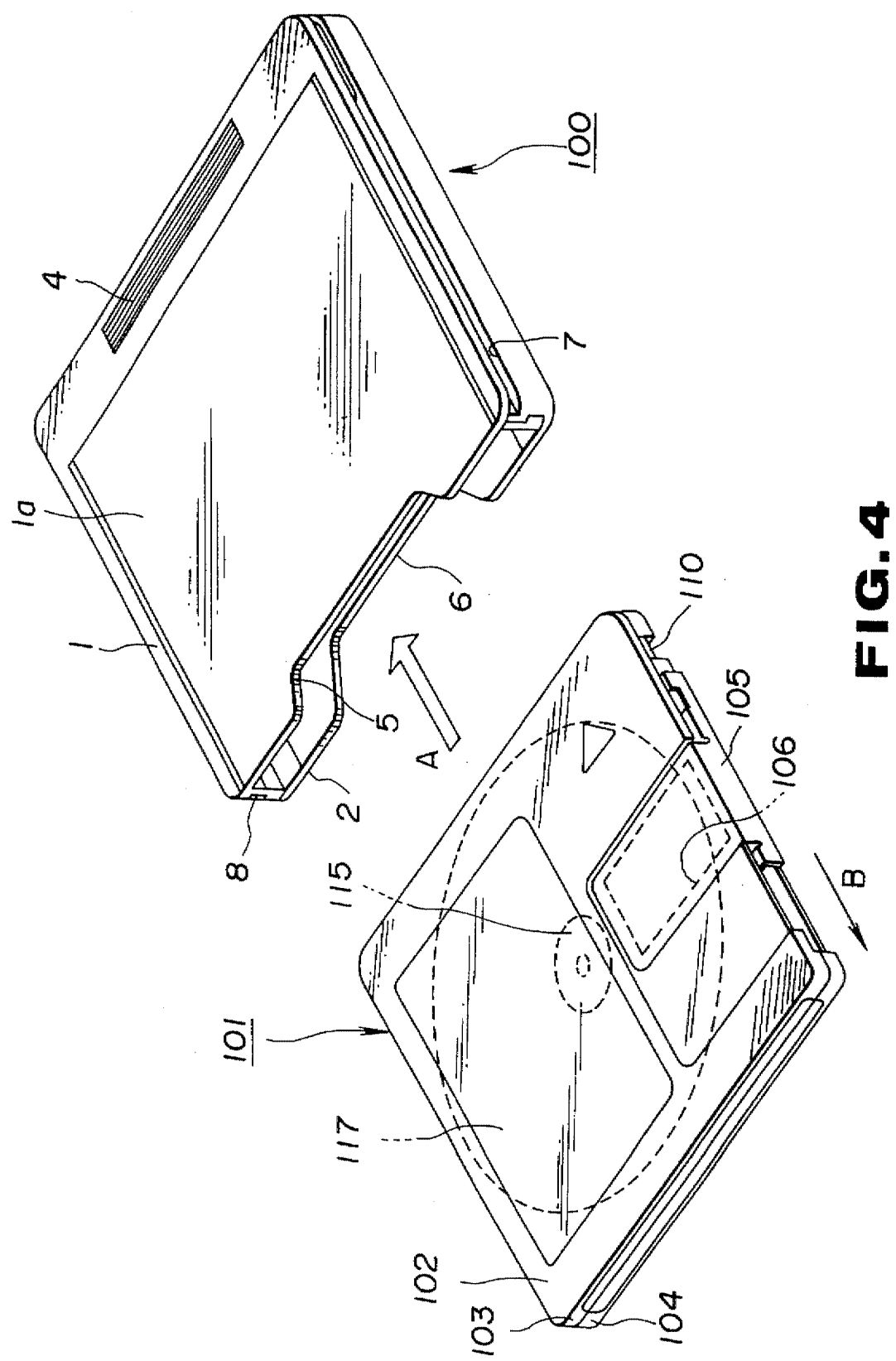
FIG. 4 is a perspective view showing a casing for a disc cartridge according to the present invention and a disc cartridge about to be introduced therein.

FIG. 4 shows a casing 100 for a disc cartridge 101 according to the present invention. This disc cartridge 101 includes a cartridge main body 102 and a recording disc, such as an optical disc or a magneto-optical disc, accommodated therein.

Figure 5:
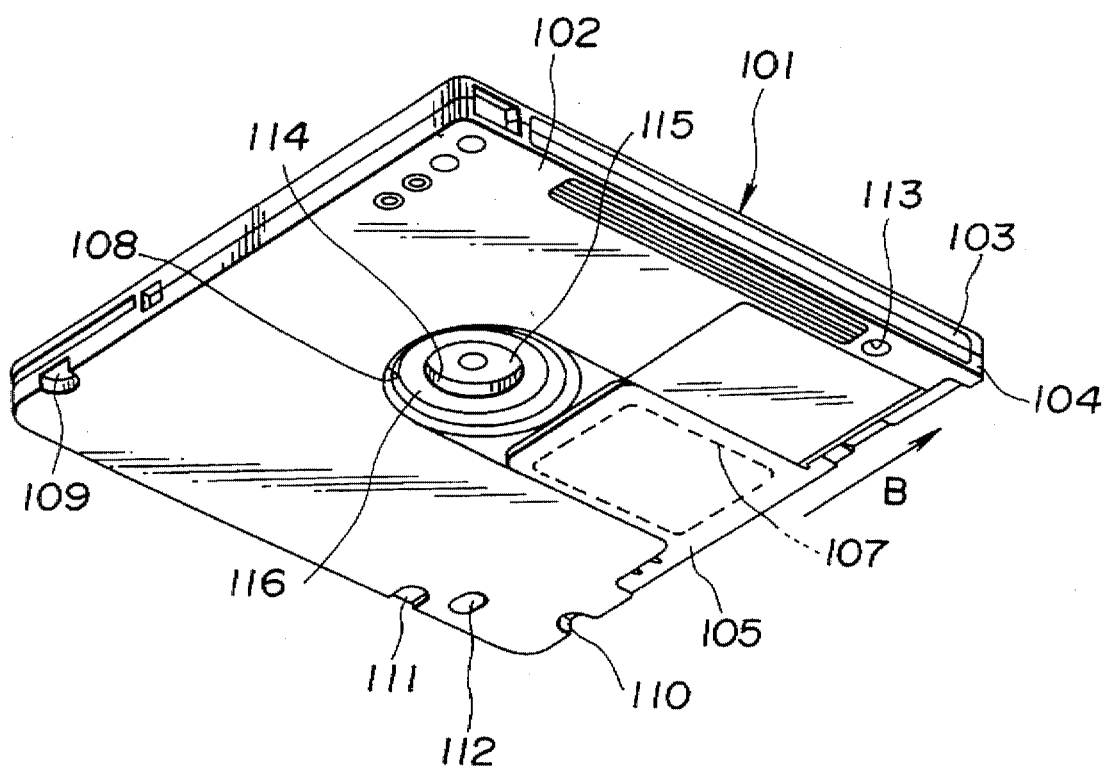
FIG. 5 is a perspective view, as seen from the bottom, showing an arrangement of the disc cartridge shown in FIG. 4.
Figure 6:
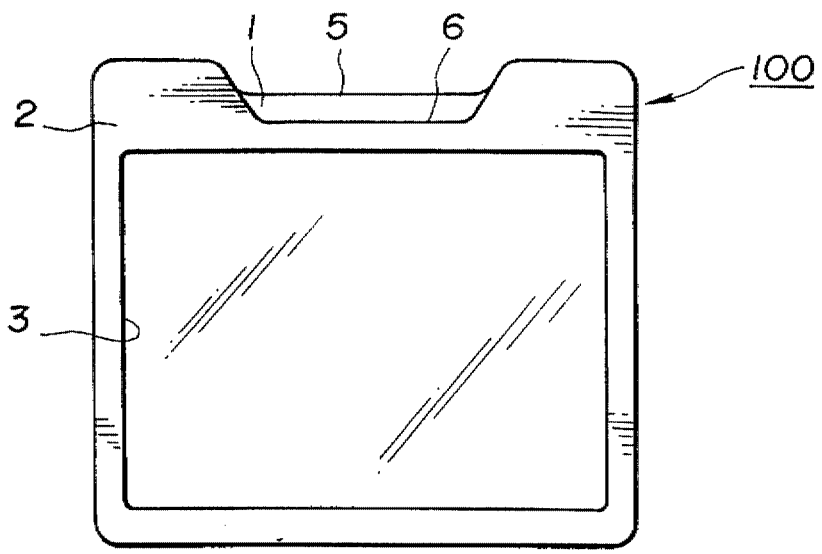
FIG. 6 is a front view showing the arrangement of the casing shown in FIG. 4.
Figure 7:
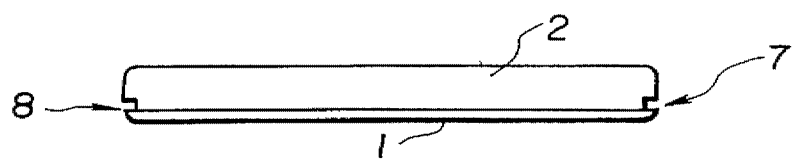
FIG. 7 is a back view showing the arrangement of the casing shown in FIG. 4.
Figure 8:
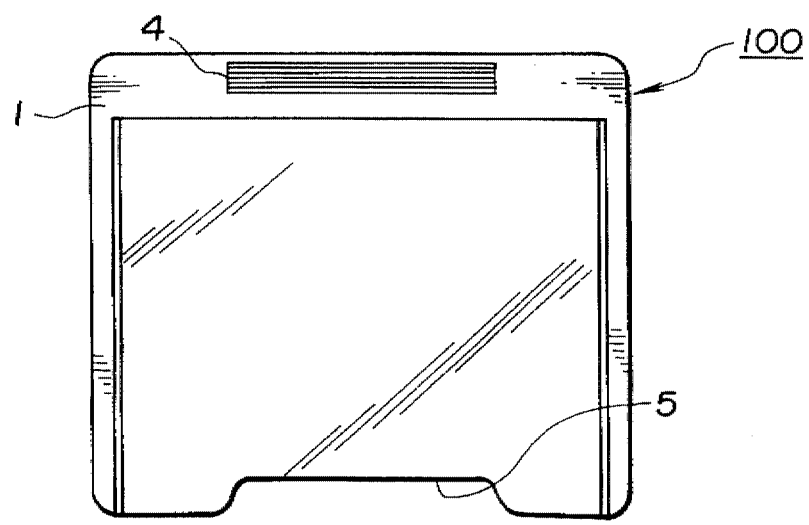
FIG. 8 is a bottom view showing the arrangement of the casing shown in FIG. 4.
Figure 9:
FIG. 9 is a front view showing the arrangement of the casing shown in FIG. 4.

The disc cartridge 101 includes the cartridge main body 102 made up of upper and lower halves 103, 104 abutted and connected to each other in the form of a thin case, as shown in FIGS. 4 and 5. The recording disc 117 is housed for rotation within the cartridge main body 102.

The recording disc 117 includes a disc substrate formed of a synthetic resin and a signal recording layer deposited on one of the major surfaces of the disc substrate. The recording disc 117 has a center chucking aperture 114. The rim part of the chucking aperture 114 on the major surface of the disc substrate serves as a chucking reference surface 116. A chucking plate 115 is mounted on the opposite major surface of the disc substrate for closing the chucking aperture 114.

The cartridge main body 102 is formed as a thin case having a substantially rectangular major surface having a side having a length substantially corresponding to the diameter of the recording disc 117. A pair of substantially rectangular recording/reproducing apertures 106, 107 are formed in register with each other on the upper and lower major surfaces of the cartridge main body 102. The recording/reproducing aperture 107 in the lower half 104 causes one of the major surfaces of the recording disc 117 to be exposed to outside across the inner and outer rims of the disc 117. The recording/reproducing aperture 106 in the upper half 103 causes the other major surface of the recording disc 117 to be exposed to outside across the inner and outer rims of the disc 117.

The recording/reproducing apertures 106, 107 are opened or closed by a shutter member 105 slidably mounted on the cartridge main body 102. The shutter member 105 is formed from a thin metal sheet by bending it into a substantially U-shape and includes a pair of shutter plates for opening and closing the recording/reproducing apertures 106,107. The shutter plates are interconnected at a center web portion and extended parallel to each other. The shutter member 105 has its center web portion slidably supported by a lateral side of the cartridge main body 102 so that the shutter plates are extended parallel to the major surfaces of the cartridge main body 102. When the shutter member 105 is moved to a position in which the shutter plates are in register with the recording/reproducing apertures 106, 107, the shutter plates close these recording/reproducing apertures 106, 107. As shown by arrow B in FIGS. 4 and 5, the shutter member 105 is slid rearwards with respect to the direction of introducing the disc cartridge 101 into the recording/reproducing apparatus indicated by arrow A in FIG. 4. The result is that the shutter member 105 has its shutter plates moved towards rear on the major surface of the cartridge main body 102 to open the recording/reproducing apertures 106, 107.

A circular chucking aperture 108 is formed at a center position on the lower major surface of the cartridge main body 102. The chucking aperture 108 causes the chucking aperture 114, chucking reference surface 116, and the chucking plate 115 of the recording disc 117 to be exposed to the outside.

The lower major surface of the cartridge main body 102 has a pair of positioning holes 112, 113 for positioning the disc cartridge when the disc cartridge is loaded in positioning the disc recording/reproducing apparatus. These positioning holes 112, 113 are formed in the vicinity of the front and rear ends in the lower major surfaces of the cartridge main body 102.

The lower major surface of the cartridge main body 102 is formed with a pair of recesses 110, 109 and a disc type discriminating recess 111. The recesses 110, 109 are adapted for capturing the disc cartridge by the disc loading unit of the recording/reproducing apparatus. These recesses 110, 109 are formed on both lateral sides at the front side of the lower major surface of the cartridge main body 102 so as to be opened on the lateral sides of the cartridge main body 102. The disc type discriminating recess 111 is formed on the front side in the lower major surface of the cartridge main body 102. The disc type discriminating recess 111 has its depth set depending on the type of the recording disc 117 housed in the cartridge main body.

The casing for the disc cartridge according to the present invention is made up of a top plate member 1 as a first member and a bottom plate member 2 as a second member, as shown in FIGS. 4 and 6 to 10.

The top plate member 1 has a top plate section 1a of a size and shape substantially corresponding to the size and shape of the major surface of the cartridge main body 102, and is integrally cast from e.g. a synthetic resin in the form of a flat plate. The top plate member 1 is formed of a light-transmitting material, such as acrylic resin, e.g. polymethacrylate, ABS resin, polycarbonate or polystyrene.

Figure 11:
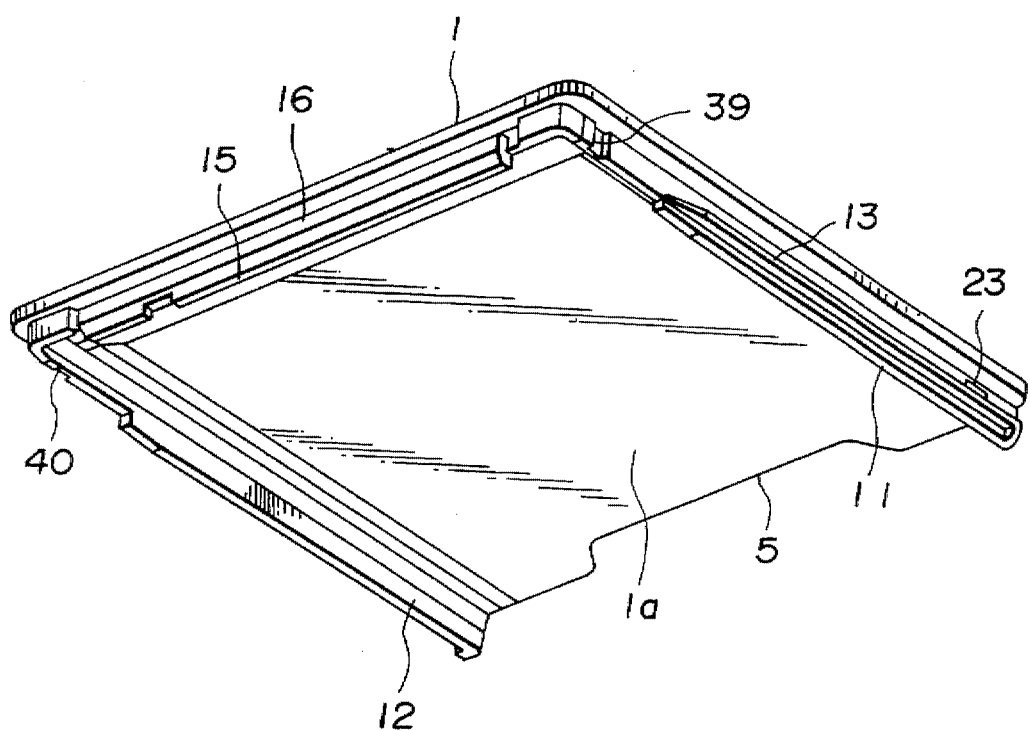
FIG. 11 is a perspective view, as seen from the bottom side, showing an arrangement of a top plate member constituting the casing for the disc cartridge shown in FIG. 4.
Figure 12:
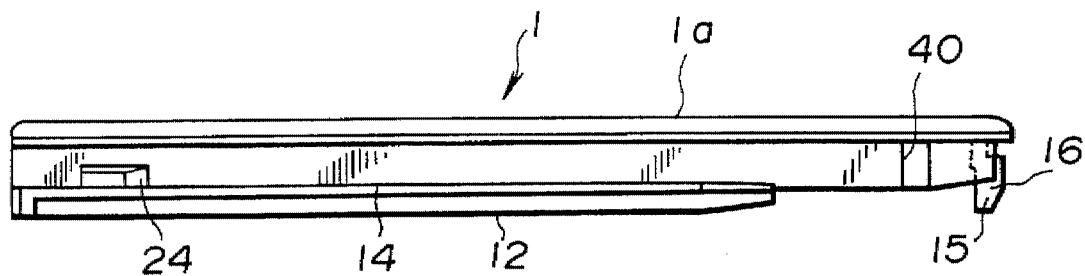
FIG. 12 is a side view showing an arrangement of a top plate member.

The top plate member 1 has a pair of inner sidewall members 11, 12 on both lateral sides of the lower surface thereof extending parallel to the lateral sides of the top plate section 1a, as shown in FIG. 11. The top plate member 1 also has an inner rear wall member 15 parallel to the rear side of the top plate section 1a, as shown in FIG. 11. The inner sidewall members 11, 12 and the inner rear wall member 15 are cast as one with the top plate section 1a for defining a U-shaped peripheral wall interrupted at the front side. These sidewall sections 11, 12 and the rear wall section 15 are of a height substantially equal to the thickness of the cartridge main body 102, and are inwardly offset from the lateral sides and the rear side of the top plate section 1a by a distance corresponding to the thickness of the wall sections 11, 12 and 15.

On the outer lateral sides of the inner sidewall sections 11, 12 are formed lateral engaging ribs 13, 14 for extending laterally outwards, as shown in FIGS. 11, 12, 14 and 15. These engaging ribs 13, 14 are provided for extending from the vicinity of the front side towards the rear side and parallel to the lateral sides of the top plate section 1a. These engaging ribs 13, 14 are positioned slightly above the lower ends of the inner lateral sidewall sections 11, 12, that is towards the top plate section 1a.

On the outer lateral sides of the inner sidewall sections 11, 12 are formed retention projections 23, 24 for being extended rearwards. These retention projections 23, 24 are provided towards the front side of the inner sidewall sections 11, 12 adjacent to the upper surfaces of the engaging ribs 13, 14. These retention projections 23, 24 are protruded by an amount slightly smaller than the amount of protrusion of the engaging ribs 13, 14. These retention projections 23, 24 are each of a front end face at right angles to the sidewall sections 11, 12 and a rear end face inclined relative to the sidewall sections 11, 12 with the amount of protrusion being gradually decreased towards the rear side.

On the outer lateral sides of the inner sidewall sections 11, 12 are formed a pair of vertically extending slits 39, 40. These slits 39, 40 are formed for being extended from the proximal ends towards the lower ends of the inner sidewall sections 11, 12.

On the lower surface of the top plate section 1a are formed a pair of lateral shoulders 48, 49 and a rear shoulder 50 on both lateral sides and on the rear side, respectively. These shoulders 48 to 50 are protruded only slightly to prevent the disc cartridge 101 introduced into the casing 100 from being slidingly contacted with the mid portion of the top plate section 1a.

A cut-out 5 is formed on the front side of the top plate section 1a for causing the rear end of the disc cartridge 101 housed within the casing 100 to be exposed to outside.

Figure 10:
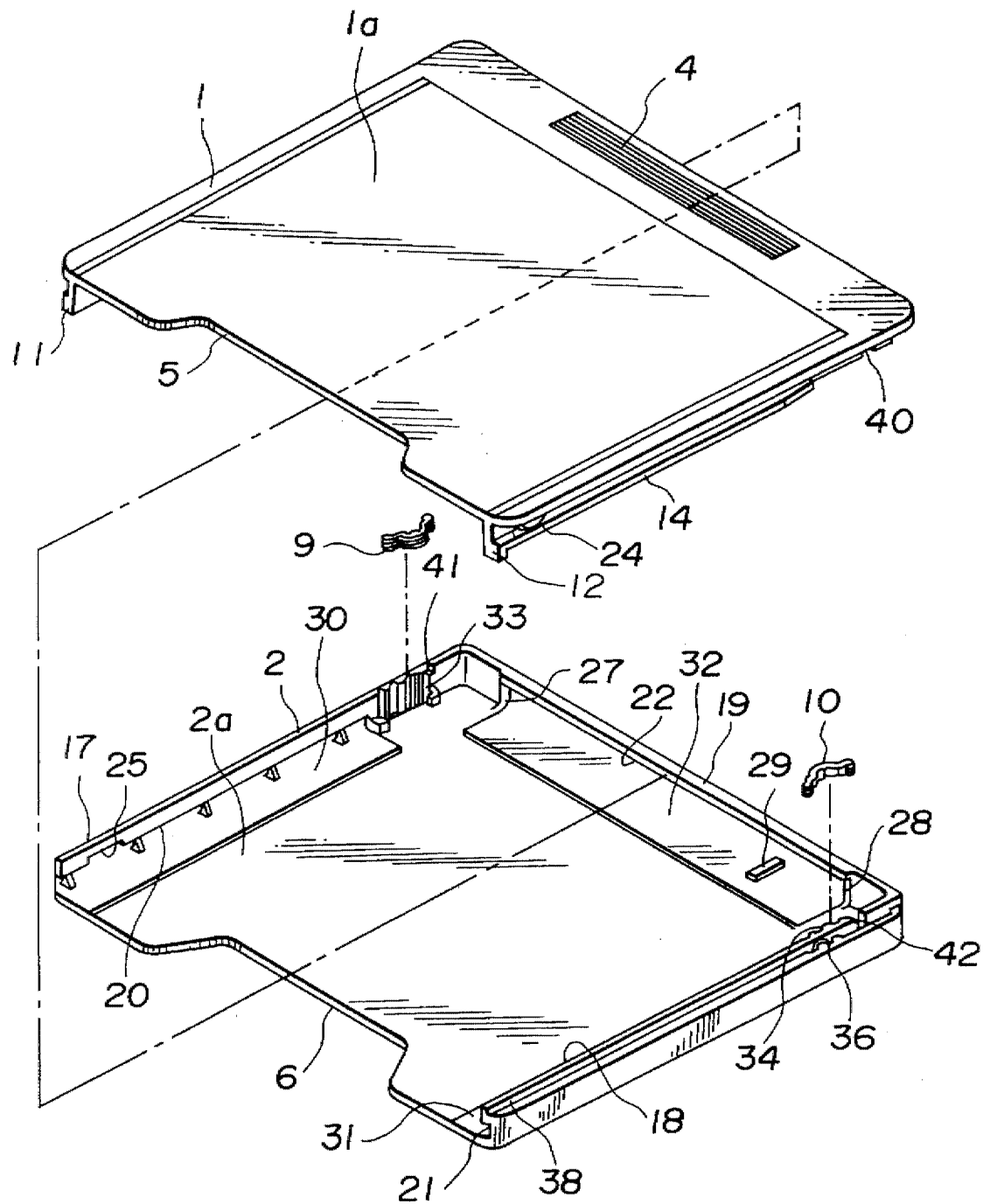
FIG. 10 is an exploded perspective view showing the arrangement of the casing shown in FIG. 4.

The bottom plate member 2 has a bottom plate section 2b of substantially the same shape as the top plate section 1a and is cast as one from plastics or like material. The bottom plate member 2 is formed of a material showing excellent heat resistance, such as heat-resistant ABS resin or polycarbonate, The bottom plate member 2 has a pair of outer sidewall members 17, 18 on both lateral sides of the upper surface thereof extending parallel to the lateral sides of the bottom plate section 2a, as shown in FIG. 10. The bottom plate member 2 also has an outer rear wall member 19 parallel to the rear side of the bottom plate section 2a. The outer sidewall members 11, 12 and the outer rear wall member 15 are cast as one with the bottom plate section 2a for defining a U-shaped peripheral wall interrupted at the front side. These outer sidewall sections 17, 18 and the rear wall section 19 are of a height substantially equal to the thickness of the cartridge main body 102, and are formed for extending along the lateral sides and the rear side of the bottom plate section 2a.

Figure 13:
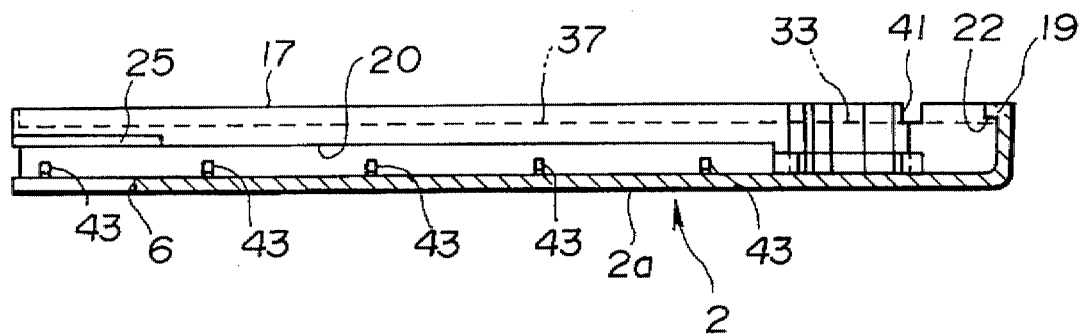
FIG. 13 is a side view showing an arrangement of a top plate member constituting the casing for the disc cartridge.
Figure 14:
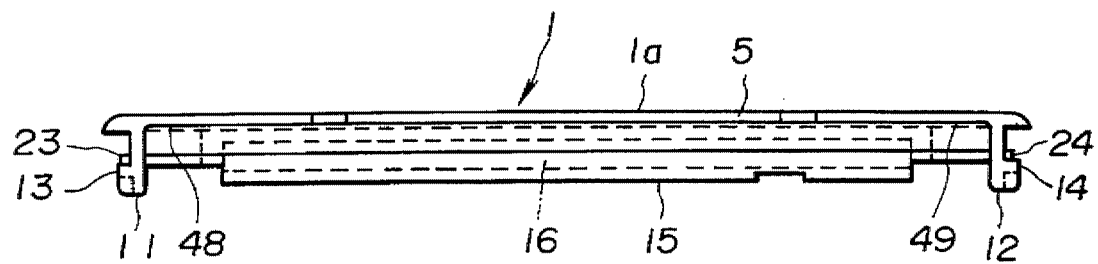
FIG. 14 is a front view showing the shape of a top plate member constituting the casing for the disc cartridge shown in FIG. 4.
Figure 16:
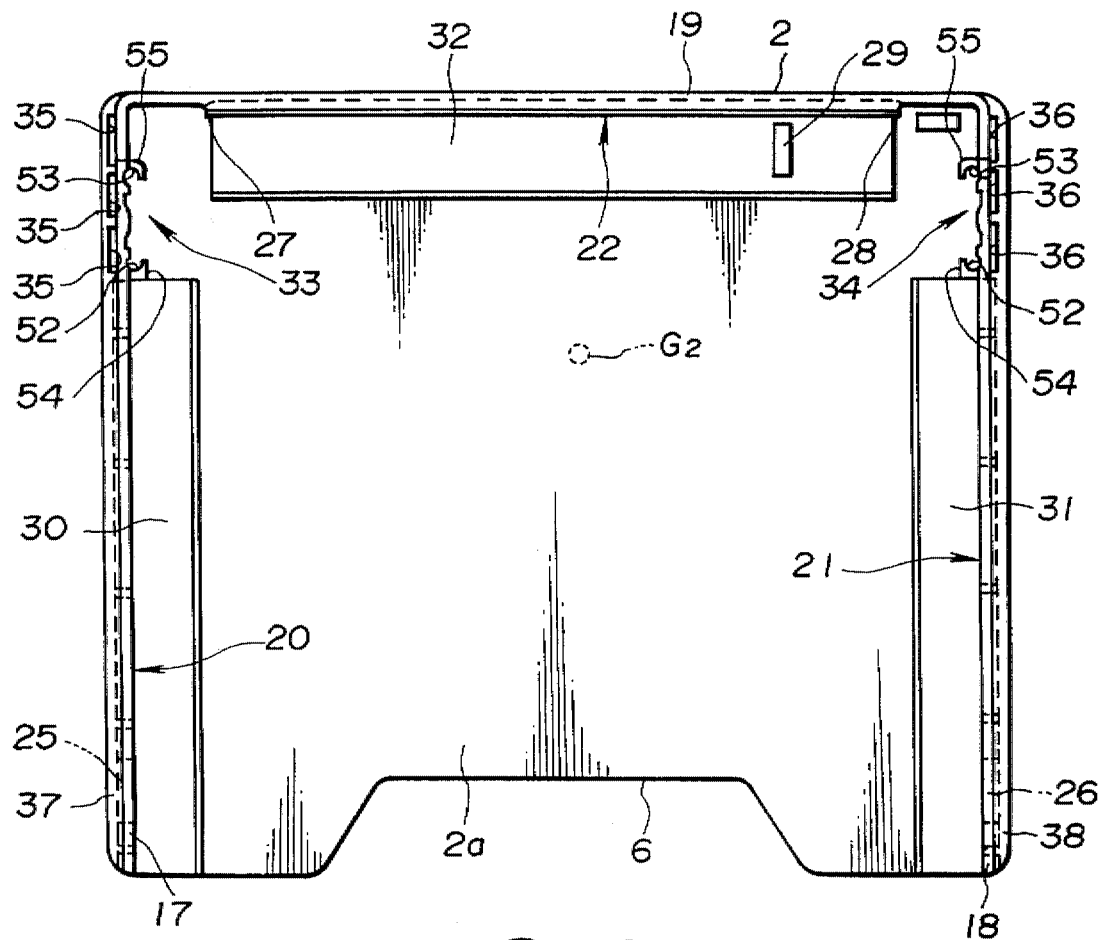
FIG. 16 is a plan view showing the shape of a bottom plate member constituting the casing for the disc cartridge shown in FIG. 4.
Figure 17:
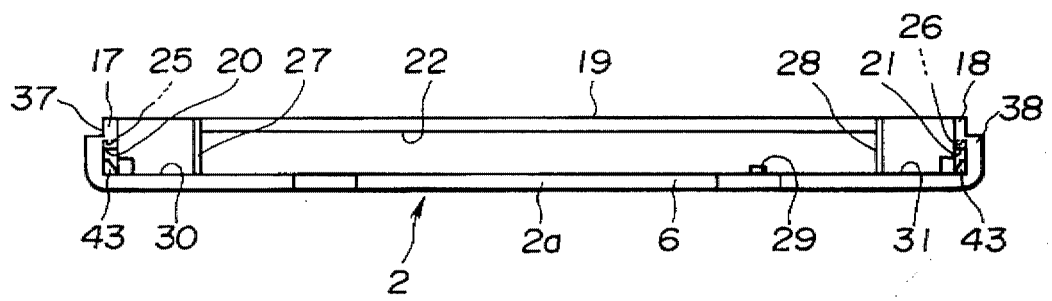
FIG. 17 is a front view showing the shape of the bottom plate member.

In the inner lateral sides of the outer sidewall sections 17, 18 are formed engaging lateral grooves 20, 21 for extending inwards, as shown in FIGS. 13, 16 and 17. These grooves 20, 21 are formed parallel to the upper surface of the bottom plate section 2a from the vicinity of the front sides towards the rear sides of the outer sidewall members 17, 18. These grooves 20, 21 are formed slightly above the proximal sides of the outer sidewall sections 17, 18, that is at slightly spaced apart positions with respect to the bottom plate section 2a, with the upper ends of the grooves 20, 21 serving as engaging lugs. On the inner sides of the outer rear wall member 19, that is the front lateral side, of the outer rear wall member 19, a flange 22 operating as a rear engaging lug is formed for being protruded towards the front side.. The flange 22 is provided for being extended from one towards the other lateral sides of the outer rear wall member 19 along the upper edge of the outer rear wall member 19 in parallel with the upper surface of the bottom plate section 2a. The lower lateral side of the flange 22 and the bottom plate section 2a make up an engaging rear groove.

In the inner lateral sides of the outer sidewall sections 17, 18 are formed retention recesses 25, 26, respectively, for being opened inwards. These retention recesses 25, 26 are formed in register with the retention projections 23, 24 at forward sides of the outer sidewall members 17, 18 in communication with the upper sides of the engaging lateral grooves 20, 21. These retention recesses 25, 26 are each slightly shallower in depth than the engaging lateral grooves 20, 21.

In the upper lateral edges of the outer lateral surfaces of the outer sidewall members 17, 18 are formed recesses 37, 38 for extending as steps across the front and rear sides of the outer sidewall sections 17, 18 along the upper lateral edges of the sidewall members 17, 18. The upper sides of the recesses 37, 38 are opened towards the upper lateral sides of the outer sidewall members 17, 18.

The rear portions of the outer sidewall members 17, 18 are formed with a pair of cut-outs 41, 42 in register with the vertical slits 39, 40. These cut-outs 41, 42 are formed for extending from the upper ends towards the proximal sides of the outer sidewall sections 17, 18.

The front side of the bottom plate section 2a is formed with a cut-out 6 for causing a rear part of the disc cartridge 101 housed within the casing 100 to be exposed to the outside.

On the lateral sides and the rear side of the bottom plate 2a are formed a pair of lateral steps 30, 31 and a rear step 32, respectively. These steps 30 to 32, having a small amount of protrusion, are used for preventing the disc cartridge 101 from being slidingly contacted with the mid portion of the bottom plate section 2a when the disc cartridge 101 is introduced into the casing 100.

The rear step 32 is formed with a mistaken insertion inhibiting protrusion 29. This protrusion is formed at a position on the rear side of the bottom plate section 2a slightly offset from the center towards a lateral side of the bottom plate section 2a. The function of the mistaken insertion inhibiting protrusion 29 will be explained subsequently.

Figure 18:
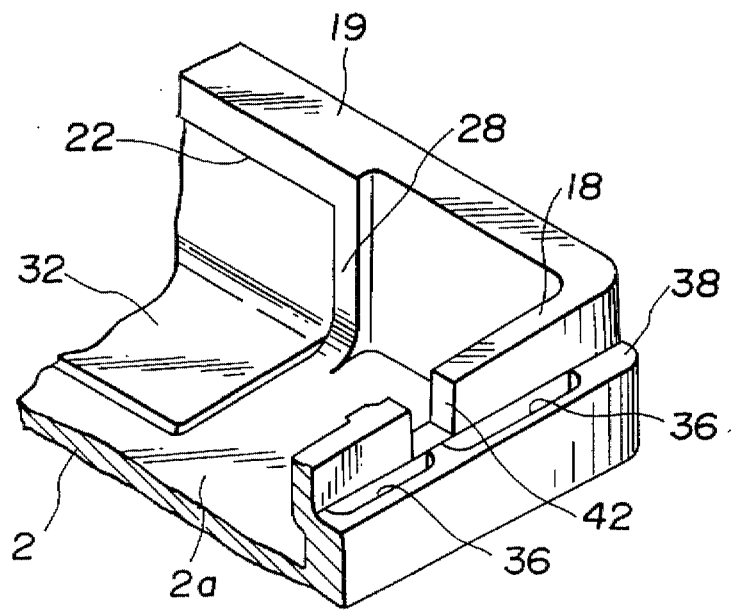
FIG. 18 is an enlarged partial perspective view of the bottom plate member shown in FIG. 17.

On both end parts of the flange 22 are formed a pair of rib-shaped reinforcements 27, 28 in continuation to the flange 22, as shown in FIGS. 16 and 18. These reinforcements 27, 28 are cast as one with the inner surface of the outer rear wall member 19 for extending from the flange 22 up to the bottom plate section 2a. At the lower parts within the engaging lateral grooves 20, 21 are formed plural reinforcement ribs 43 for extending from the lateral sides of the grooves 20, 21 up to the bottom plate section 2a.

Figure 19:
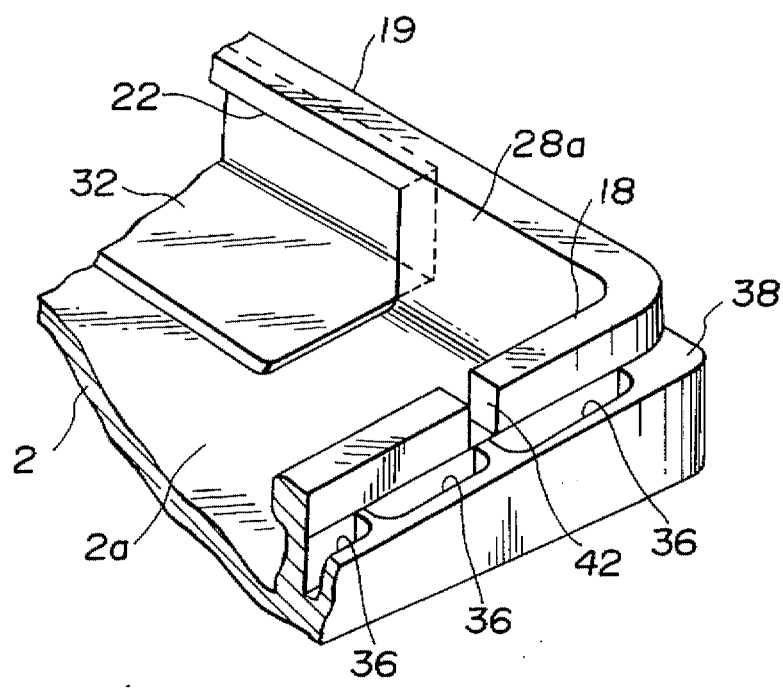
FIG. 19 is an enlarged partial perspective view showing a modification of the bottom plate member.

Meanwhile, the reinforcements 27, 28, shown in FIG. 18, may be formed as shown at 28a in FIG. 19. The reinforcement 28a shown in FIG. 19 is formed on the entire surface of the flange 22 of the outer rear wall member 19 and on both sides of the engaging rear groove.

Figure 22:
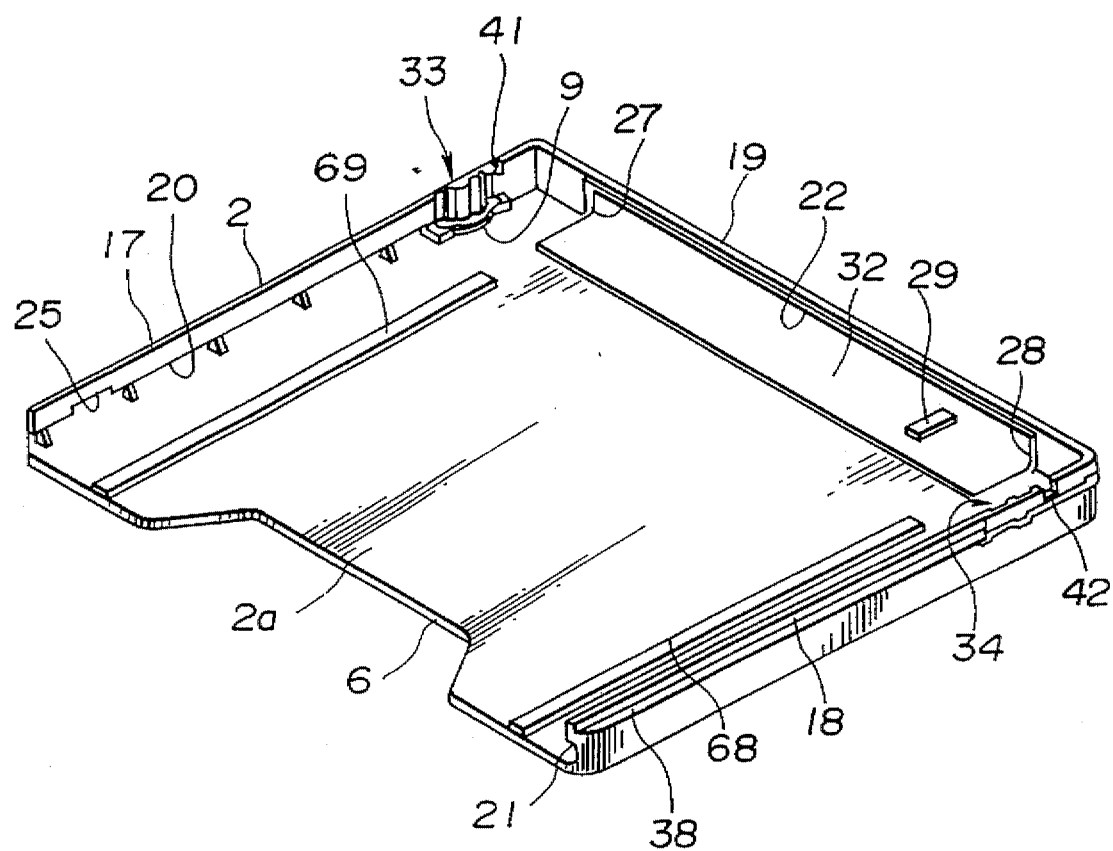
FIG. 22 is a perspective view showing another modification of the bottom plate member constituting the casing for the disc cartridge.
Figure 23:
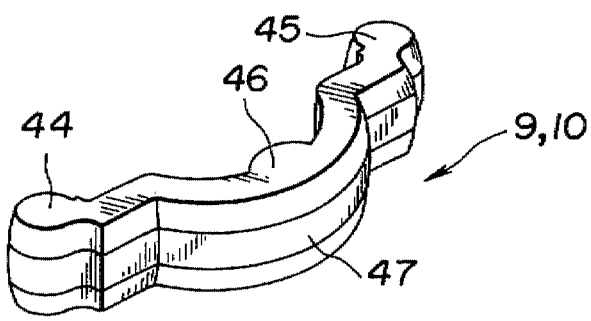
FIG. 23 is a perspective view, as seen from the front side, showing the shape of the locking member constituting the casing for the disc cartridge.
Figure 24:
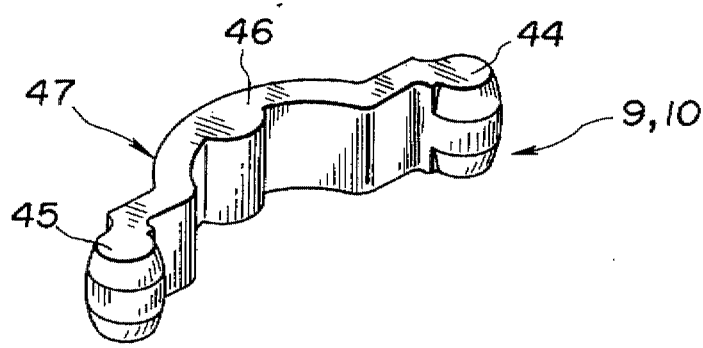
FIG. 24 is a perspective view, as seen from the rear side, showing the shape of the locking member.
Figure 25:
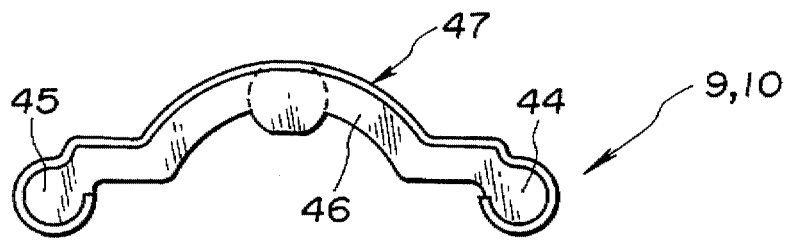
FIG. 25 is a plan view showing the shape of the locking member shown in FIG. 24.
Figure 26:
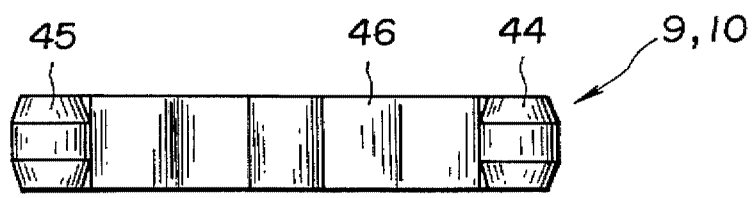
FIG. 26 is a plan view showing the shape of a bottom plate member constituting the casing for the disc cartridge.

The top plate member 1 and the bottom plate member 2 are provided with step-shaped protrusions which are spaced apart from the sidewall members, as shown in FIG. 22. These protrusions 69, 68 are formed as ribs as one with the upper surface of the bottom plate member 2 in parallel with the outer sidewall sections 17, 18.

The top plate member 1 and the bottom plate member 2 are connected to each other by having the lateral engaging ribs 13, 14 engaged in the engaging lateral grooves 20, 21, as shown in and by having the rear engaging rib 16 engaged between the flange 22 and the bottom plate section 2a, that is in the engaging rear groove. For connecting the top plate member 1 and the bottom plate member 2 in this manner, the top plate member 1 is positioned ahead of the bottom plate member 2 and the rear sides of the lateral engaging ribs 13, 14 are introduced at the front ends of the engaging lateral grooves 20, 21, with the top plate member 1 being then moved towards the rear for sliding the lateral engaging ribs 13, 14 within the engaging lateral grooves 20, 21. When the top plate member 1 is slid until the top plate section 1a is in register with the bottom plate section 2a, the rear engaging rib 16 is engaged in the rear engaging groove, while the retention projections 23, 24 are engaged with the retention recesses 25, 26. For engaging the retention projections 23, 24 in the retention grooves 25, 26, these retention projections 23, 24 are first introduced into a space between the sidewall members 17, 18, from the front ends of the outer sidewall members 17, 18 for outwardly thrusting and thereby slightly deflecting the outer sidewall members 17, 18. As the retention projections 23, 24 reach the position facing the retention recesses, the outer sidewall members 17, 18 are restored to their initial states for engaging the retention projections 23, 24 in the retention recesses 25, 26.

The top plate member 1 and the bottom plate member 2 are engaged with each other at the lateral sides and rear sides of the top plate section 1a and the bottom plate section 2a, with the top plate section 1a and the bottom plate section 2a extending parallel to each other, for defining an opening at the front side. This opening has a length substantially corresponding to the length of a side of the cartridge main body 103, and a width substantially corresponding to the thickness of the cartridge main body 102. The lower ends of the inner sidewall members 11, 12 and the inner rear wall member 15 are caused to bear against the upper surface of the bottom plate section 2a, while the upper ends of the outer sidewall members 17, 18 and the outer rear wall member 19 are caused to bear against the rim of the lower surface of the top plate section 1a.

Figure 20:
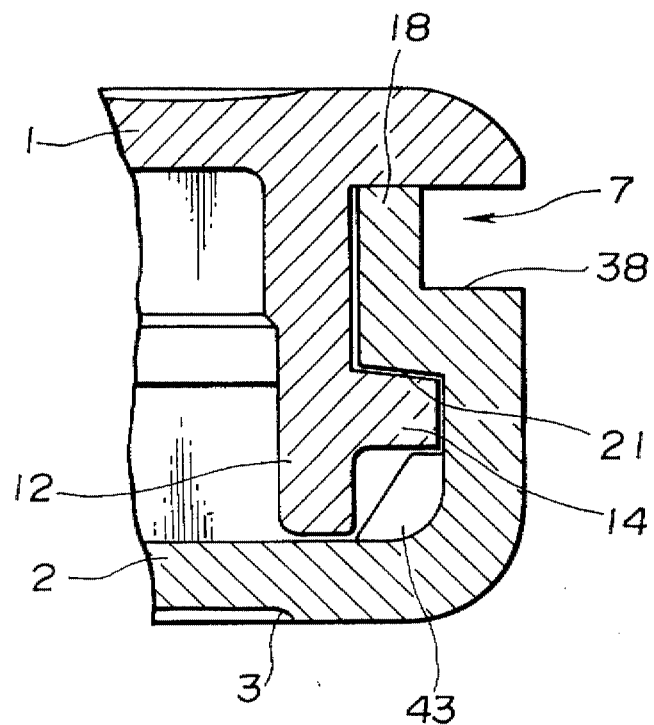
FIG. 20 is an enlarged partial cross-sectional view showing the state of engagement of the top and bottom plate members at the lateral sides in the casing for the disc cartridge.
Figure 21:
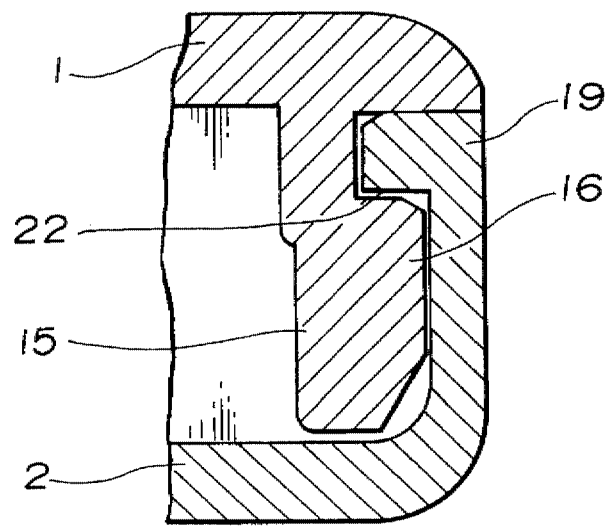
FIG. 21 is an enlarged partial cross-sectional view showing the state of engagement of the top and bottom plate members at the rear sides in the casing for the disc cartridge.

The recesses 37, 38 formed on the upper sides of the outer sidewall members 17, 18 and both lateral sides of the top plate section 1a delimit lateral grooves 7,8. That is, the upper ends of the outer sidewall members 17, 18 are engaged with the lateral sides of the top plate section 1a at the positions offset inwards by a distance equal to the depths of the recesses 37, 38, as shown in FIG. 20. These lateral grooves 7, 8 are formed for being extended from the front side towards the rear side of the lateral surface of the casing 100. The rear bottom ends of the lateral grooves 7, 8 are formed with bottomed holes constituted by slits 41, 42 formed in the outer sidewall members 17, 18 and by the vertical grooves 39, 40 formed in the inner sidewall members 12.

Figure 15:
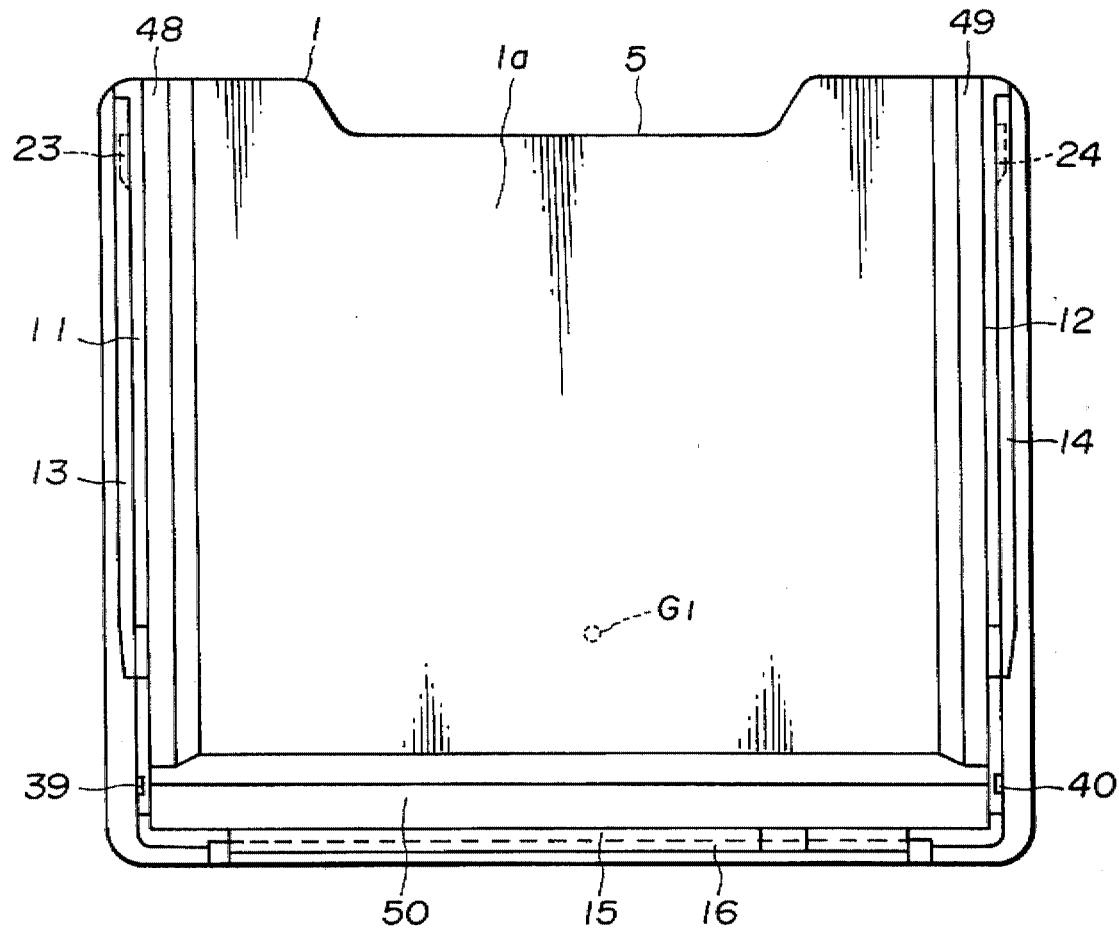
FIG. 15 is a bottom view showing the shape of a top plate member.

Meanwhile, an injection gate of a metal mold for injection molding the top plate member 1 is formed as a so-called pin gate at a position sightly offset towards the rear on the upper surface of the top plate section 1a, as shown at $G_1$ in FIG. 15. An injection gate of a metal mold for injection molding the bottom plate member 2 is formed as a so-called pin gate at a position sightly offset towards the rear on the lower surface of the bottom plate section 2a, as shown at $G_2$ in FIG. 16. That is, the top plate member 1 and the bottom plate member 2 are similar to each other in shape and the gate positions are in register with each other. Consequently, the top plate member 1 and the bottom plate member 2 are substantially similar in the state of deformation, such as shrinkage, caused by the cooling step during injection molding, so that the engaging ribs of the sidewall sections may be engaged smoothly with each other. The injection gate may also be so-called film gates or submarine gates, instead of the pin gates. In these cases, the injection gates on the top plate member 1 and on the bottom plate member 2 may be positioned in register with each other to provide for a substantially equal state of deformation, such as shrinkage, to assure smooth engagement of the top and bottom plate members 1 and 2.

At a recessed position within the space between the members 1 and 2, a pair of locking members 9, 10 are provided for retaining the disc cartridge 101 introduced between these members 1 and 2. These locking members 9, 10, formed of a flexible and resilient material, such as polyacetal, are composed of end grips 44, 45 and a resilient arm 46 spanning the end grips 44, 45, as shown in FIGS. 23 to 26. The end grips 44, 45 are columnar-shaped and have their axes parallel to each other. The resilient arm 46 is arcuate in shape and interconnect the end grips 44, 45. The resilient arm 46 is bent in a direction at right angles to the axes of the grips 44, 45. The apex point of the arcuately bent arm 46 is at an equidistant position with respect to the grips 44, 45. The arcuately bent parts of the locking members 9, 10 play the part of retention surfaces 47 for retaining the disc cartridge 101.

The locking members 9, 10 are mounted by a pair of locking member mounting sections 33, 34 formed on the bottom plate member 2. These locking member mounting sections 33, 34 are formed on the inner lateral surfaces of the outer sidewall sections 17, 18 at the recessed inner ends of the sidewall members 17, 18, as shown in FIG. 16. These locking member mounting sections 33, 34 are each provided with fore and aft holding protrusions 54, 55. These holding protrusions 54, 55 are formed at the lower parts of the outer sidewall members 17, 18 for being protruded inwards in continuation to the bottom wall section 2a. That is, these holding projections 54, 55,are provided at the corners between the outer sidewall sections 17, 18 and the bottom plate section 2a. These holding protrusions 54, 55 are mounted facing each other at a distance substantially corresponding to the lengths of the locking members 9, 10. The facing sides of the holding protrusions 54, 55 are formed with holding recesses 52, 53, respectively. These holding recesses 52, 53 are opened towards the top and are each of a cross-sectional profile of a part of an ellipse or an oblong circle having its longer ax is oriented in the fore-and-aft direction. The locking members 9, 10 are held by the holding projections 54, 55 by having the grips 44, 45 fitted into the holding recesses 52, 53.

These locking members 9, 10 are mounted with the axes of the grips 44, 45 at right angles to the bottom plate section 2a and with the retention surfaces 47 directed towards the inner side of the bottom plate section 2a. That is, the arcuately bent arms 46 of the locking members 9, 10 are adapted for being protruded towards the inner side of the bottom plate section 2a. The arcuately bent arms 46 of these locking members 9, 10 may be resiliently bent in a direction of approaching the outer sidewall members 17, 18. When the arms 46 are resiliently deflected in this manner, the grips 44, 45 are moved in the fore-and-aft direction within the holding recesses 52, 53, respectively.

Meanwhile, the inner sidewall sections 11, 12 of the top plate member 1 are cut out at the rear parts so that the rear parts are shorter in a distance from the top plate section 1a than the central and forward parts by a length corresponding to the width of the locking members 9 and 10. This prevents the inner sidewall sections 11, 12 from being abutted against the locking members 9, 10 held by the locking member mounting sections 33, 34, while preventing the locking members 9, 10 from being detached upwards from the locking member mounting sections 33, 34.

It is noted that the back sides of the locking member mounting sections 33, 34, that is the rear parts of the outer lateral sides of the outer sidewall members 17, 18, are subject to so-called sink during integral injection molding of the bottom plate member 2. Such sink is produced because the portions of the outer sidewall members 17, 18 provided with the locking member mounting sections 33, 34 are increased in thickness as compared to other parts of the outer sidewall members 17, 18 and hence are receded inwards in the course of cooling during the molding process. For preventing such sink from being produced, the portions of the outer sidewall members 17, 18 in register with the locking member mounting sections 33, 34 are hollow due to the provision of clearances 35, 36.

For housing and holding the disc cartridge 101 in the above-described casing 100 for a disc cartridge according to the present invention, the disc cartridge 101 is introduced into the space between the top plate member 1a and the bottom plate member 2a from the front side via the opening in a direction shown by arrow A in FIG. 4.

As the front side of the disc cartridge 101 reaches the rear side of the casing 101, the lateral surfaces of the front side of the cartridge main body 102 thrust the retention surfaces 47, 47 of the locking members 9, 10 for deflecting the arms 46, 46 in a direction of approaching the outer sidewall members 17, 18. When the front side of the cartridge main body 102 reaches a predetermined position of being substantially abutted on the inner lateral wall 15 of the casing 100, the locking members 9, 10 are in register with the recesses 110, 109. At this time, the arms 46, 46 of the locking members 9, 10 are restored to their initial states under their own resiliency for causing the retention surfaces 47, 47 to be engaged in the recesses 110, 109. With the retention surfaces 47, 47 of the locking members 9, 10 engaging in the recesses 110, 109, the disc cartridge 101 is retained and limited in its movement of being detached rearwards, that is out of the casing 100 via the opening under shock or vibrations.

Figure 31:
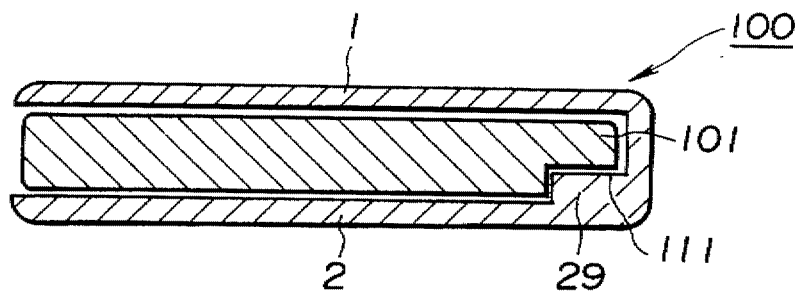
FIG. 31 is a longitudinal sectional view showing the state in which the disc cartridge is contained and held in the casing for the disc cartridge.

The mistaken insertion inhibiting protrusion 29 is fitted at this time in the disc discriminating recess 111 of the disc cartridge 101, as shown in FIG. 31.

The disc cartridge 101, which is now in position within the casing 100, is accommodated between and protected from outside by the members 1 and 2.

When a plurality of casings 100 are inserted into a rack adapted for containing plural casings, they are held in position by the lateral grooves 7, 8. The casings 100 may be protected against accidental removal from the rack by engaging means provided on the rack being engaged in the bottomed openings formed by the slits 41, 42.

When the disc cartridge 101 housed within the casing 100 is to be taken out of the casing 100, the rear part of the disc cartridge 101 exposed to outside via the cut-outs 5, 6 is held by the finger and pulled rearwards with respect to the casing 100. This causes the retention surfaces 47, 47 of the locking members 9, 10 to be thrust by the forward lateral sides of the cartridge main body 102, while causing the arms 46, 46 of the locking members 9, 10 to be deflected in a direction of approaching the outer sidewall members 17, 18 for releasing the retention of the disc cartridge 101. The disc cartridge 101 may now be taken out of the casing 100 via the opening. As the disc cartridge 101 is moved further rearwards, the locking members 9, 10 are reset to their initial states. The disc cartridge 101 may be moved further rearwards so as to be taken out of the casing 100.

The mechanism of preventing mistaken insertion of the disc cartridge into the casing of the present invention is explained.

The casing 100 of the present invention is designed to prevent the disc cartridge 101 from being introduced up to the housing complete position within the casing 100 even when the disc cartridge 101 is inserted via the opening in the mistaken direction.

Figure 27:
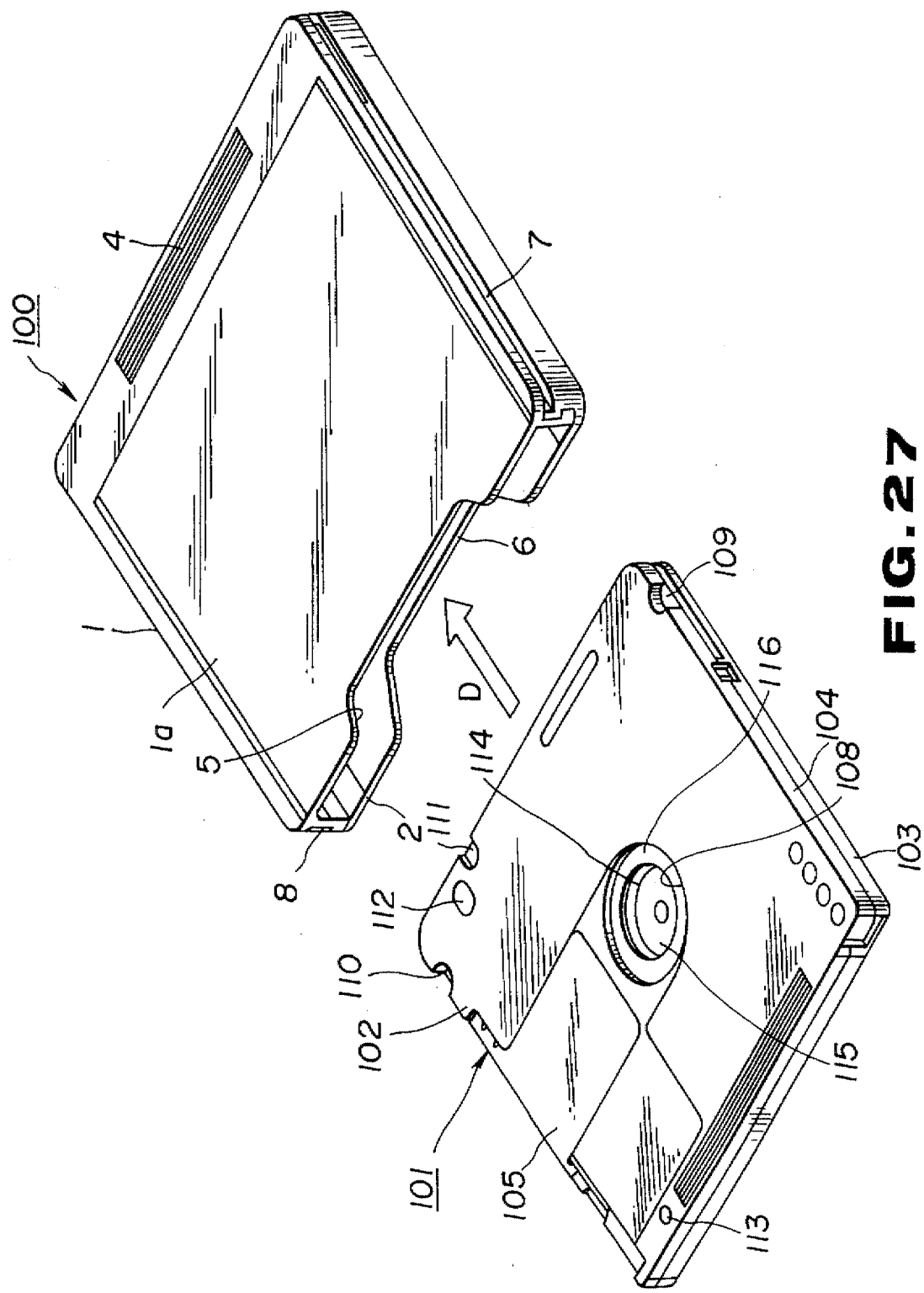
FIG. 27 is a perspective view showing the state of a first manner of mistaken insertion in the casing for the disc cartridge.
Figure 28:
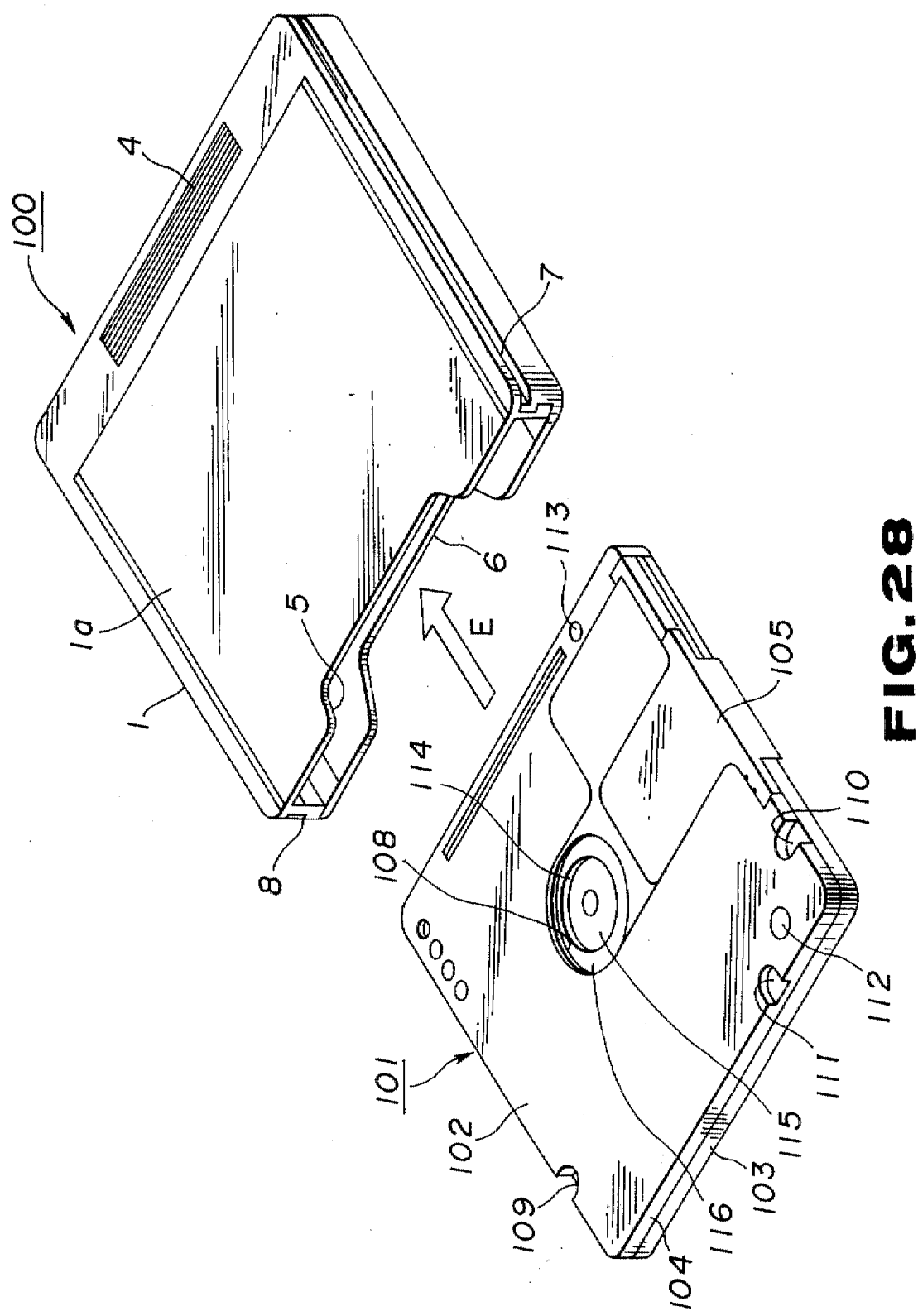
FIG. 28 is a perspective view showing the state of a second manner of mistaken insertion in the casing for the disc cartridge.
Figure 29:
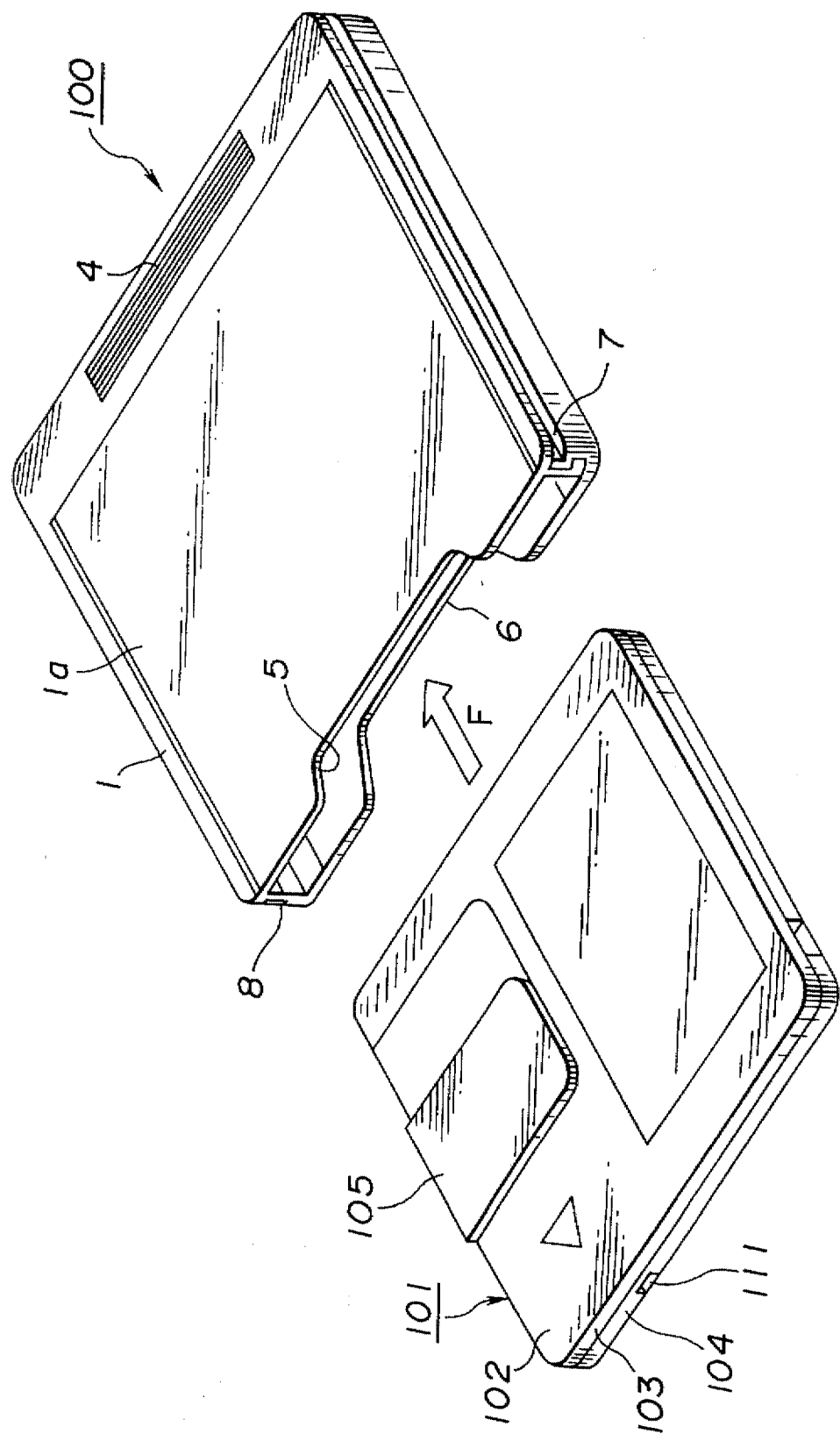
FIG. 29 is a perspective view showing the state of a third manner of mistaken insertion in the casing for the disc cartridge.
Figure 30:
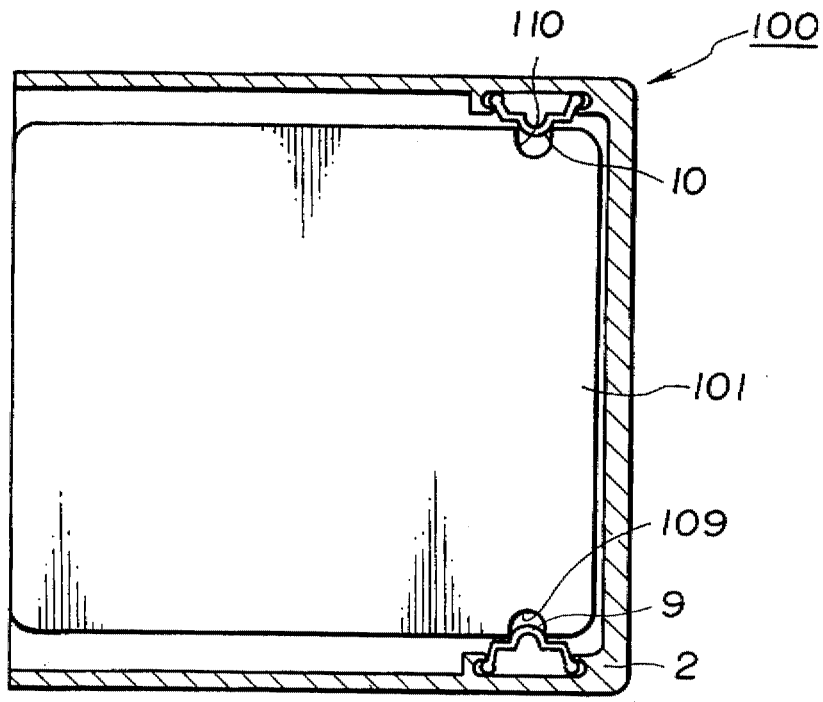
FIG. 30 is a transverse sectional view showing the state in which the disc cartridge is contained and held in the casing for the disc cartridge.

There are three possible cases of mistaken insertion of the disc cartridge 101, namely the case in which the disc cartridge 101 is inserted with its lower major surface facing upwards and with the front end side first, from the direction shown by arrow D in FIG. 27, the case in which the disc cartridge 101 is inserted with its lower major surface facing upwards and with the rear end side first, from the direction shown by arrow E in FIG. 28, and the case in which the disc cartridge 101 is inserted with its upper major surface facing upwards and with the rear end side first, from the direction shown by arrow F in FIG. 29.

Figure 33:
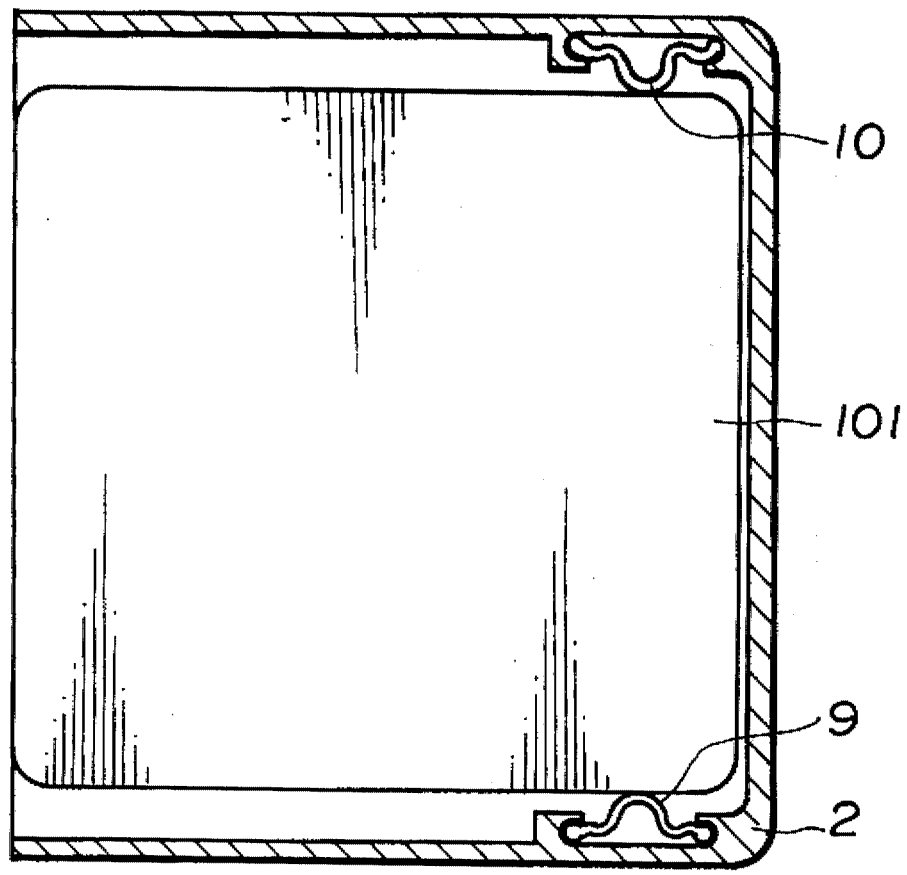
FIG. 33 is a transverse sectional view showing the disc cartridge inserted in a mistaken manner into the casing for the disc cartridge.

In any of these cases, when the disc cartridge 101 is introduced into the casing 100, the locking members 9, 10 are not aced by the recesses 110,109, so that the locking members 9, 10 remain thrust and resiliently deflected by the cartridge main body 102, as shown in FIG. 33. If the locking members 9, 10 are loft for extended period of time in the resiliently deflected state, the locking members 9, 10 undergo plastic deformation so that the disc cartridge 101 inserted in the regular position cannot be held by the locking members 9, 10.

Figure 32:
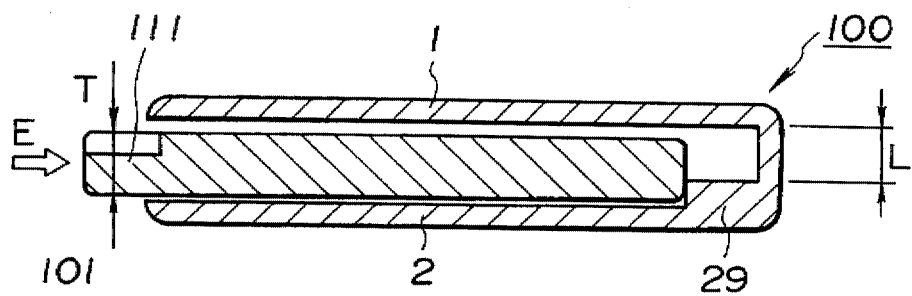
FIG. 32 is a longitudinal sectional view showing the state in which the disc cartridge is inserted in a mistaken manner into the casing and such mistaken insertion is inhibited.

With the present casing 100, if the disc cartridge 101 is inserted in a mistaken manner as described above, the mistaken insertion inhibiting protrusion 29 is caused to bear against the cartridge main body 102 to inhibit the insertion thereof into the casing 100, as shown in FIG. 32. That is, the distance from the upper end face of the mistaken insertion inhibiting protrusion 29 up to the lower surface of the top plate section 1a, as indicated by arrow L in FIG. 32, is shorter than the thickness of the cartridge main body 102 as indicated by arrow T in FIG. 32. Consequently, the disc type discriminating recess 111 is not faced by the mistaken insertion inhibiting protrusion 29. If the protrusion 29 is not engaged with the recess 111, the protrusion 29 is caused to bear against the cartridge main body 102 to inhibit insertion of the disc cartridge 101 into the casing 100. Meanwhile, the protrusion 29 has a height lower than the depth of the disc type discriminating recess ill.

The casing 100 which has accommodated the disc cartridge 101 therein as described above is packaged with an overlap film 201 by a packaging method as shown in FIGS. 34 to 41. The overlap film 201 is a thermally contractible film which is contracted on being heated and which is melted on being heated further.

For packaging, a label member of paper 204, which is to be a sheet-shaped member, is applied over the front end of the casing 100 so as to cover up the cut-outs 5 and 6. The label member 203 is bent at its mid part into U-shape and applied to the casing 100 to cover up the top plate section 1a and the bottom plate section 2a of the casing 100. The two parallel bent portions of the label member 204 are located at substantially the mid positions of the label member 204 and are spaced apart from each other by a distance corresponding to the thickness of the casing 100. With the label member 204 applied over the casing 100, the latter presents planar outer lateral surfaces.

Meanwhile, the label member 204 is used as a so-called index label. The label member 204, used as index label, is made up of a label coated with an adhesive and a release paper to which the label is bonded.

Figure 34:
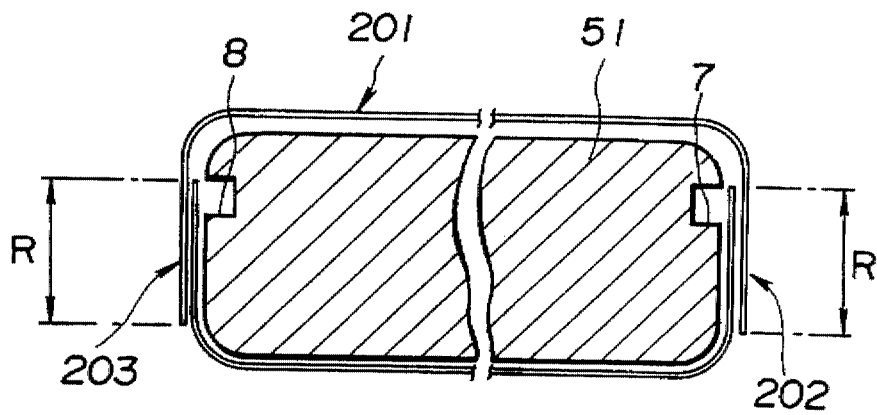
FIG. 34 is a longitudinal sectional view showing the state in which the casing for the disc cartridge has been packaged with an overlap film.

The wrapping is what is termed a caramel wrapping. First, the casing 100 is introduced into the inside of an overlap film 201 obtained by interconnecting two opposing edges of two film halves. Both end parts of the overlap film 201 in the tubular form are bent inwards to form superposed sections 202, 203, as shown in FIG. 34. These superposed sections 202,203 are heated and fused together by heat welding by a pair of heating ironing members 301, 302 making up a wrapping unit. These superposed sections 202,203 are formed on the outer lateral surfaces of the casing 100.

The heating ironing members 301,302 are formed of metal and mounted in opposition to each other, These ironing members 301, 302 are heated t,o a predetermined temperature and moved relative to each other to change the distance therebetween, These ironing members 301, 302 are provided with recesses 303, 304 in the opposite lateral sides, respectively. These recesses 303, 304 are contoured to conform t,o the profile of the lateral surfaces of the casing 100 so that both lateral sides of the casing 100 may be introduced up t,o the bottom of the recesses. Since the ridges of the lateral surfaces of the casing 100 are rounded, both corners of the recesses 303,304 are also rounded to present a cylindrical shape.

Figure 38:
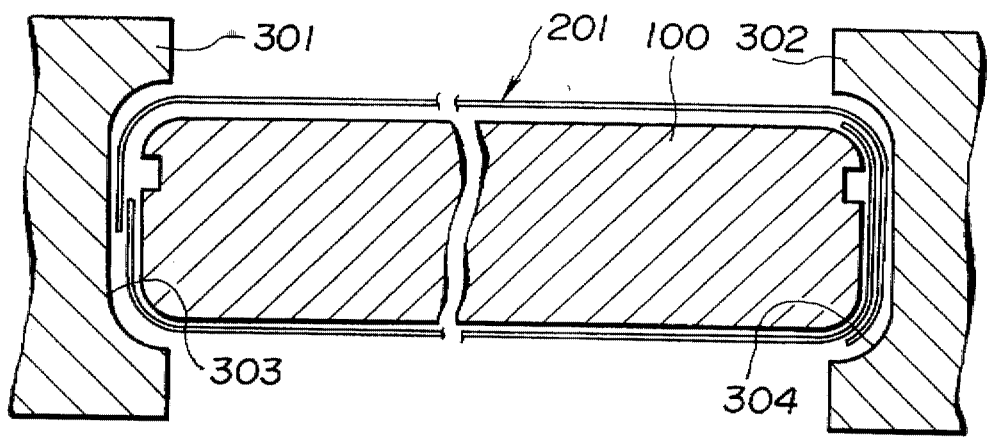
FIG. 38 is a longitudinal sectional view showing a state in which the overlap film is shifted to one side from the state of FIG. 37 when the casing for the disc cartridge is wrapped with the overlap film.
Figure 39:
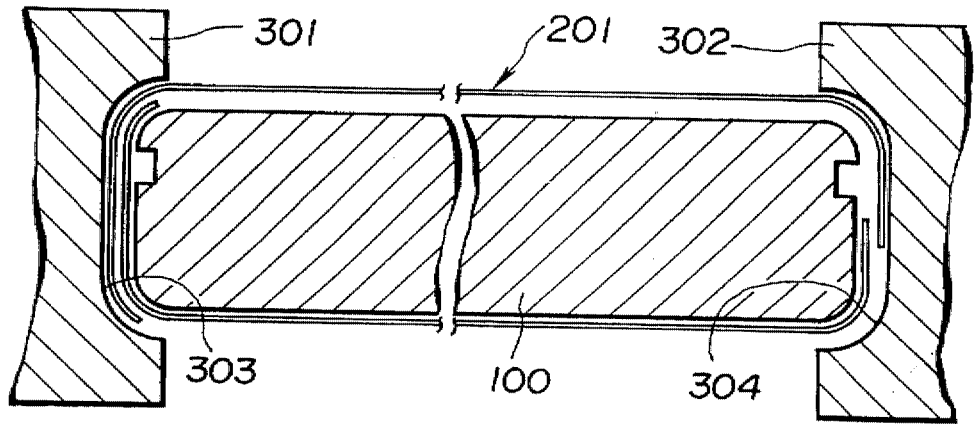
FIG. 39 is a longitudinal sectional view showing the state in which the overlap film is shifted to the opposite side from the state of FIG. 38 when the casing for the disc cartridge is wrapped with the overlap film.
Figure 40:
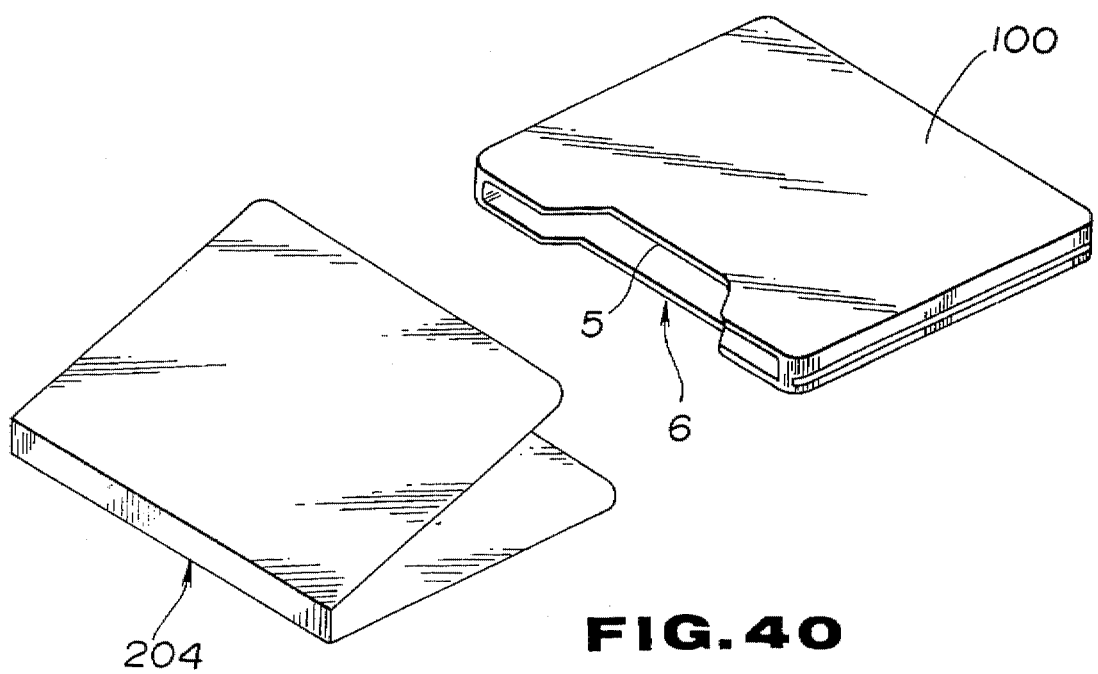
FIG. 40 is a perspective view showing the state in which a label member is about to be applied to the casing when packaging the casing with an overlap film.

The recesses 303, 304 are profiled to permit the ridges of the casing 100 to be inserted therein. The result is that, if the overlap film 201 is shift, ed in one or the other direction so that the overlap film 201 has its one end extending over the entire lateral surface of the casing 100 t,o reach the opposite side, that is the top plate section 1a or the bottom plate section 2a, the extended portion of the overlap film may still be heated by the ironing members 301, 302 so as to be heat welded, as shown in FIGS. 38 and 39.

Figure 41:
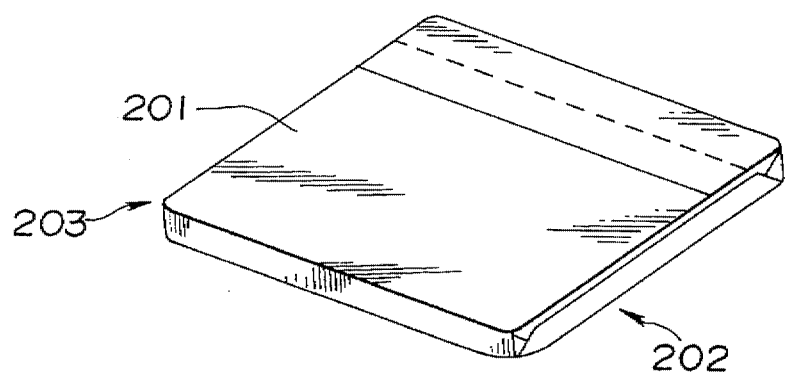
FIG. 41 is a perspective view showing the state in which a casing for a disc cartridge is packaged with an overlap film.

The overlap film 201 is heated and shrunk so as to be tightly applied to the outer surface of the casing 100 to complete the wrapping, as shown in FIG. 41. Since the casing 100 presents a planar outer surface, the overlap film 201 may be tightly applied to the outer lateral surface of the casing 100 on which the label member 204 is applied previously.

Meanwhile, the superposed portions 202,203 of the overlap film 201 are applied to cover up the lateral grooves 7, 8, as shown in FIG. 34. The portions of the superposed parts 202, 203 lying over the lateral grooves 7, 8 are not thrust fully by the ironing members 301, 302 so that there is a risk that these portions be not fused together.

Figure 35:
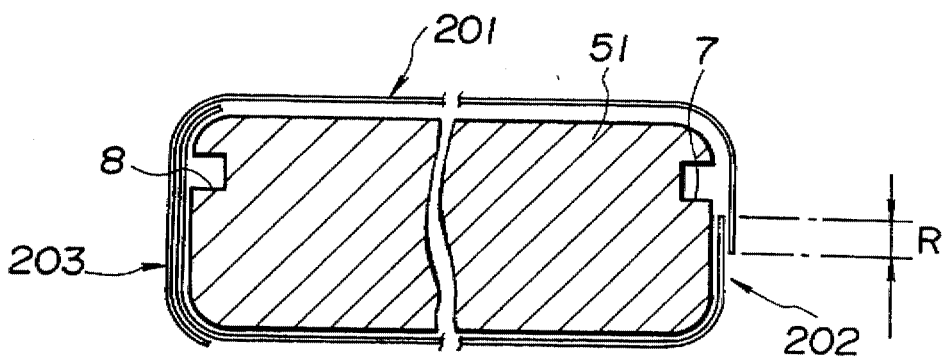
FIG. 35 is a longitudinal sectional view showing a state in which the overlap film is shifted to one side from the state of FIG. 34 when the casing for the disc cartridge is wrapped with the overlap film.
Figure 36:
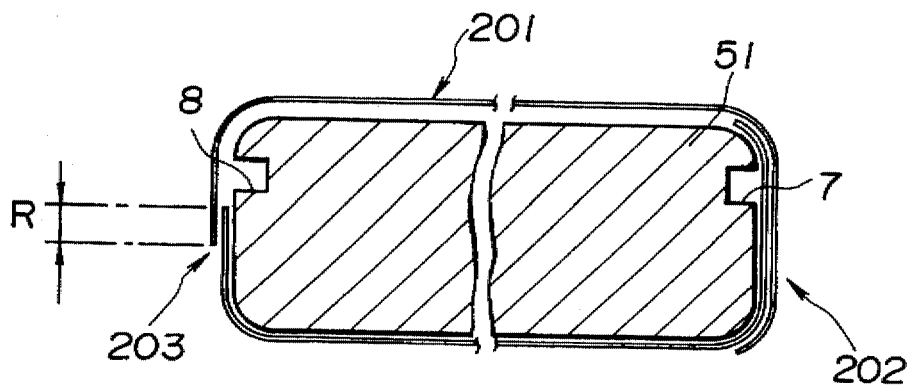
FIG. 36 is a longitudinal sectional view showing the state in which the overlap film is shifted to the opposite side from the state of FIG. 35 when the casing for the disc cartridge is wrapped with the overlap film.
Figure 37:
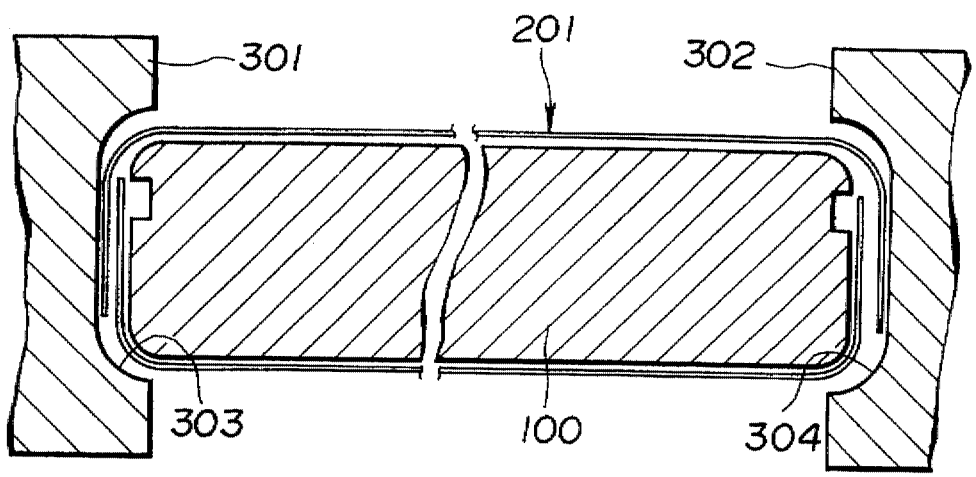
FIG. 37 is a transverse sectional view showing another state of packaging of the casing with an overlap film.

It may be an occurrence that the overlap film 201 be partially positioned towards one or the other sides of the casing 100, as shown in FIGS. 35 and 36. In these cases, one of the superposed parts 202, 203 becomes narrower in width than the lateral grooves 7, 8, as indicated by arrow R in FIGS. 35, 36. However, since the lateral grooves 7, 8 are offset more towards the top plate section 1a than the mid position of the lateral member, the superposed portions 202, 203 are not positioned over the lateral grooves 7, 8, so that the superposed portions 202, 203 are fused together reliably.

Figure 42:
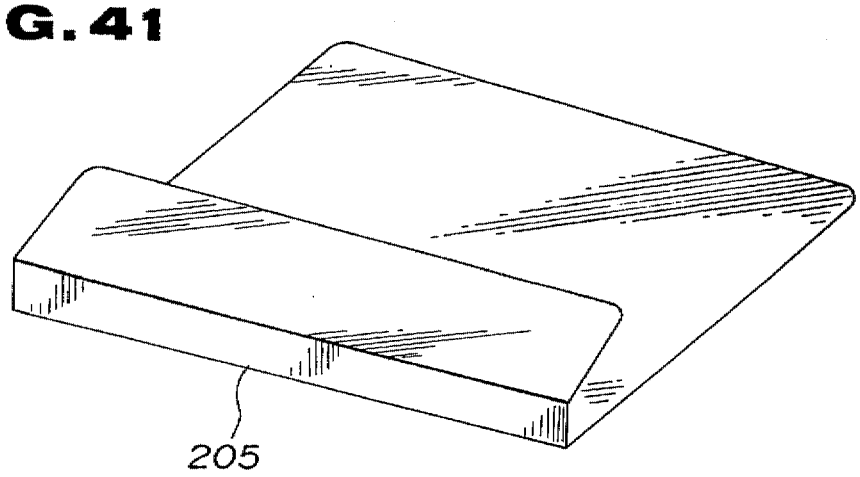
FIG. 42 is a perspective view showing a modified shape of the label member.

It is noted that the sheet-shaped member employed in the packaging method according to the present invention may also be a label member 205 adapted to cover only the front side of the casing 100, as shown in FIG. 42, instead of covering both the top plate section 1a and the bottom plate section 2a, as described in the foregoing. The label member 205 has two parallel folding lines and is bent into U-shape. The folded portion is offset towards one lateral side from the center of the label member 205 and both the flaps are spaced apart from each other by a distance corresponding to the thickness of the casing 100. The casing 100 presents a planar outer surface when it is sheathed by the label member 205.

Various modifications of the casing for the disc cartridge according to the present invention are hereinafter explained. Those parts or components similar to those of the casing 100 shown in FIG. 4 are indicated by the same reference numerals and the corresponding description is omitted for simplicity.

Figure 43:
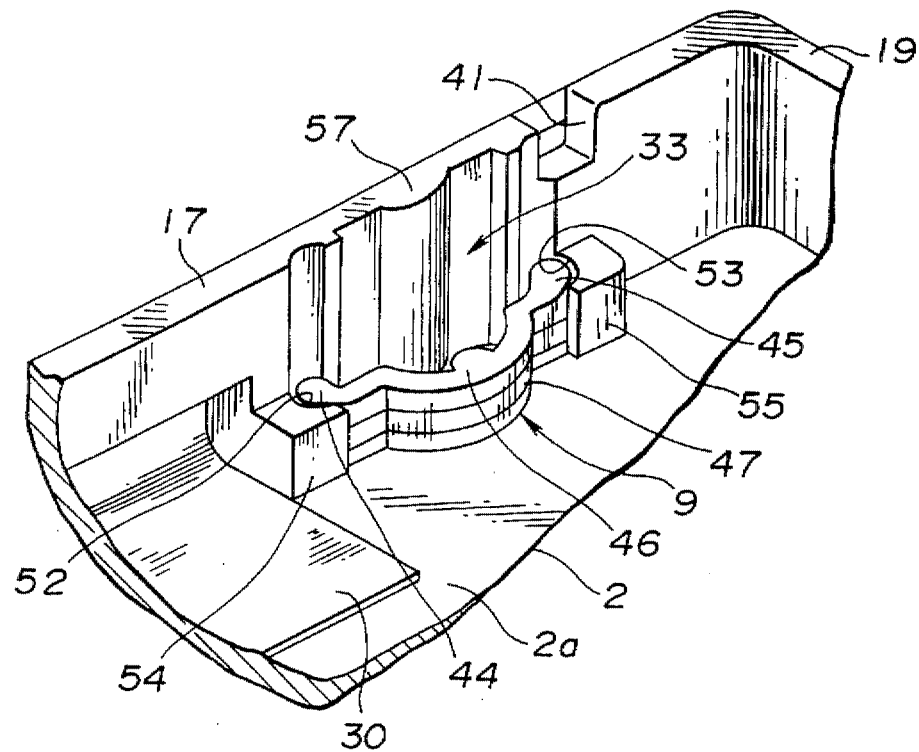
FIG. 43 is an enlarged partial perspective view showing the state in which the locking member of the casing for the disc cartridge according to a first modification of the present invention is held by the bottom plate member.
Figure 44:
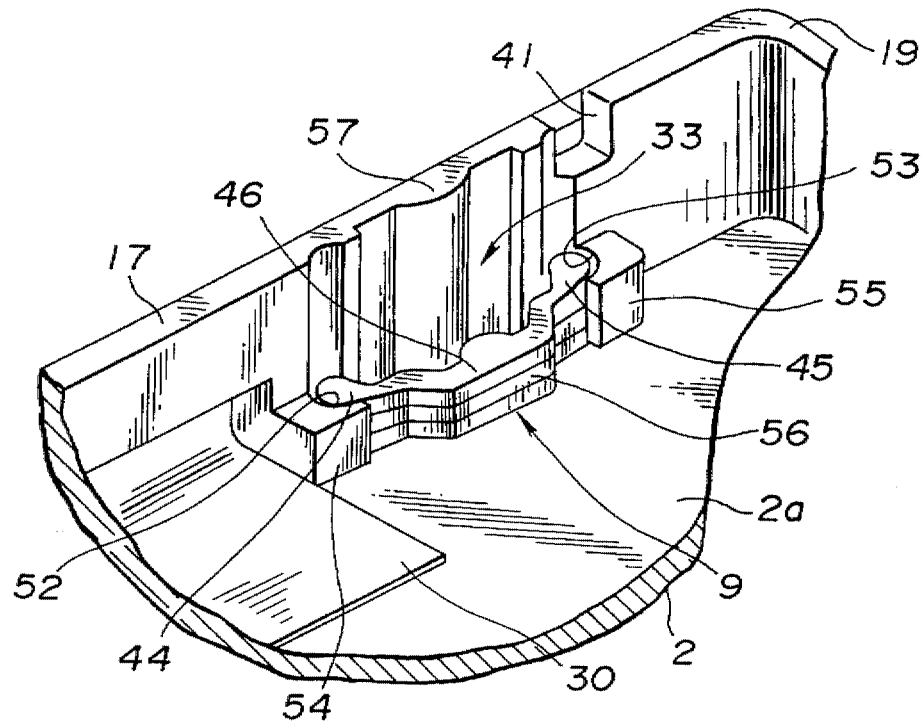
FIG. 44 is an enlarged partial perspective view showing another modification of the locking member and the manner in which the locking member is held by the bottom plate member.
Figure 45:
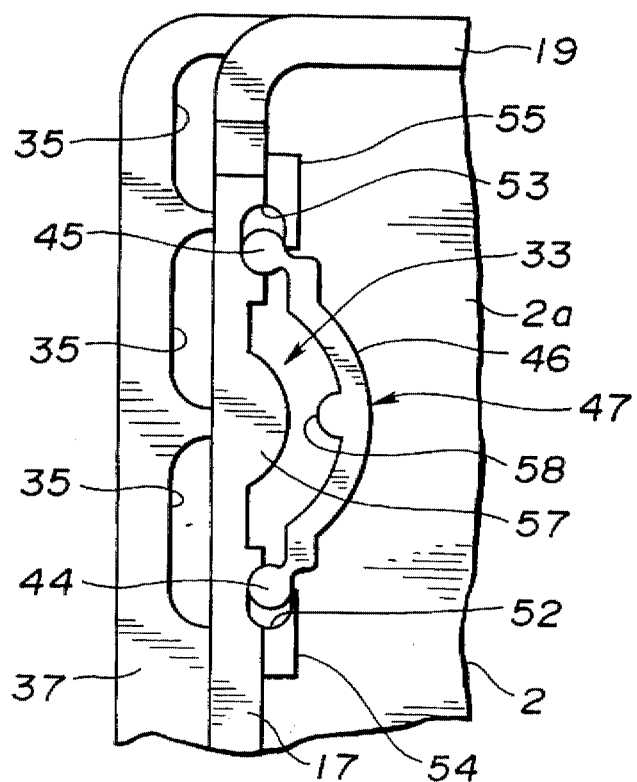
FIG. 45 is an enlarged partial plan view showing the state in which the locking member is held by the bottom plate member.

A first modification of the casing for the disc cartridge according to the present invention is first explained. The locking members 9, 10 are mounted on a pair of locking member mounting sections 33, 34 formed on the bottom plate member 2. These locking member mounting sections 33, 34 are formed on the rear parts of the opposing inner lateral sides of the outer sidewall members 17, 18, as shown in FIG. 16. These locking member mounting sections 33, 34 are provided with front and rear holding protrusions 54, 55, as shown in FIGS. 43 and 44. These holding protrusions 54, 55 are formed at the lower parts of the outer sidewall members 17, 18 for being protruded inwards in continuation to the bottom wall section 2a. That is, these holding projections 54, 55 are provided at the corners between the outer sidewall sections 17, 18 and the bottom plate section 2a. These holding protrusions 54, 55 are mounted facing each other at a distance substantially corresponding to the lengths of the locking members 9, 10. The facing sides of the holding protrusions 54, 55 are formed with holding recesses 52, 53, respectively. These holding recesses 52, 53 each have a substantially cylindrical inner surface and are opened towards the top with a cross-sectional profile of a part of an ellipse or an oblong circle having its longer axis oriented in the fore-and-aft direction. The difference between the longer axis and the shorter axis of an ellipse of the cross-sectional profile of each of the holding recesses 52, 52 is on the order of e.g. 0.3 mm, if the grips 44, 45 are of a diameter on the order of 1.2 mm.

The locking members 9, 10 are held by the holding projections 54, 55 by having the end grips 44, 45 fitted into the holding recesses 52, 53. These locking members 9, 10 are positioned with the axes of the grips 44, 45 at right angles to the bottom plate section 2a and with the retention surfaces 47 directed towards the bottom plate section 2a. That is, the arcuately bent arms 46 of these locking members 9, 10 are adapted for being extended towards the inner side of the bottom plate section 2a.

Figure 46:
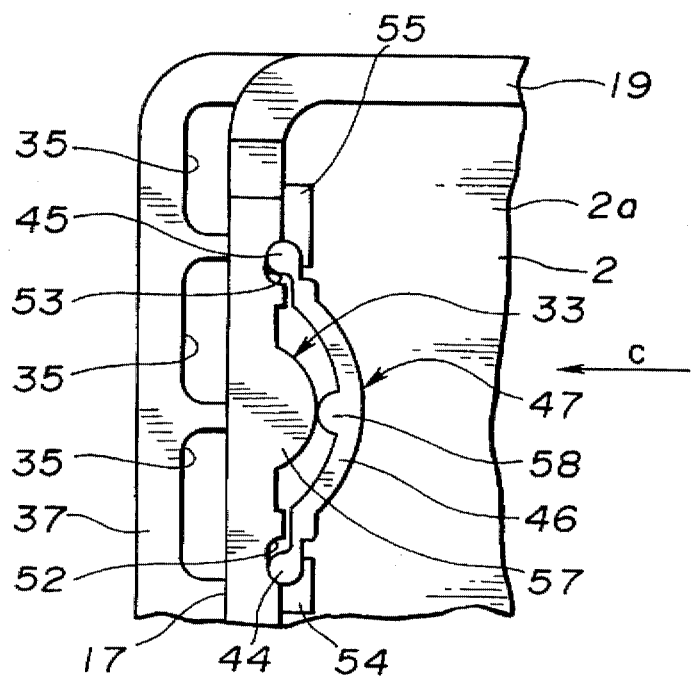
FIG. 46 is an enlarged partial plan view showing the state in which the bent arm of the locking member is flexed resiliently.
Figure 47:
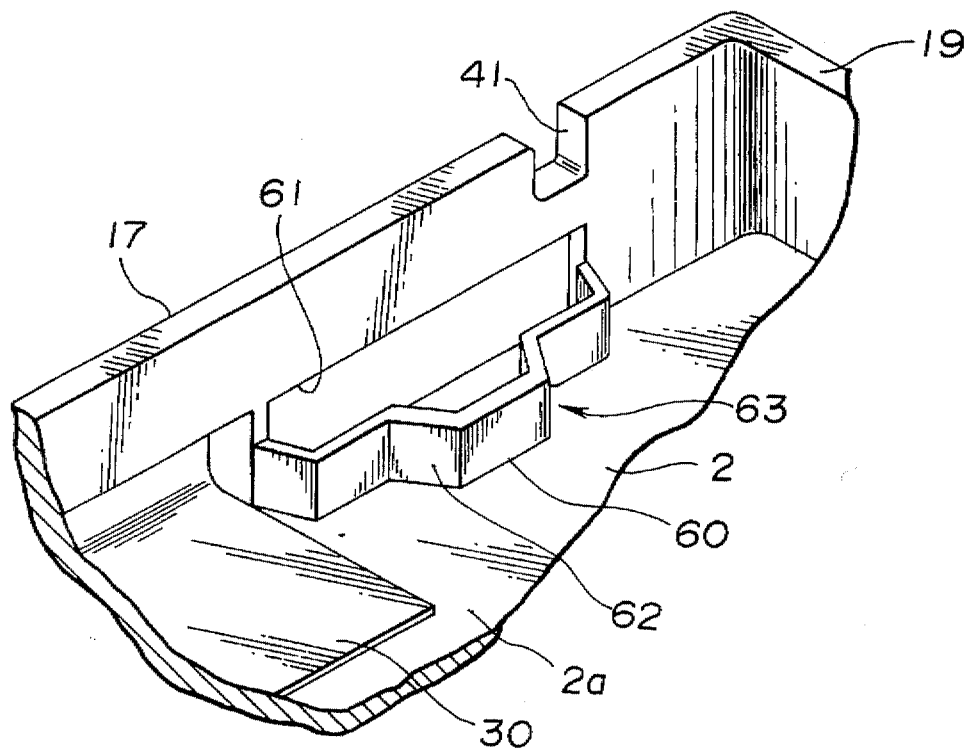
FIG. 47 is an enlarged partial perspective view showing another modification of a locking member constituting a casing for a disc cartridge according to the present invention.

As shown in FIG. 46, these locking members 9, 10 are designed for being resiliently deflected in a direction of approaching the outer sidewall members 17, 18 as indicated by arrow C in FIG. 46. When the bent arms 46 are deflected resiliently in this manner, the end grips 44, 45 are moved in the fore-and-aft direction within the holding recesses 52, 53. An abutment boss 58 is provided on the opposite side of the retention surface 47 of each of the locking members 9, 10. When the arm 46 is resiliently deflected in a direction towards the outer sidewall members 17, 18, the abutment boss 58 is abutted against the apex of an abutment rib 57 provided at a mid part of each of the locking member mounting sections 33, 34, for preventing excessive resilient deflection of the arm 46 as shown in FIG. 46, The rib 57 is formed for extending vertically between holding protrusions 54, 55 on the inner surface of each of the outer sidewall members 17, 18.

The inner sidewall members 11, 12 of the top plate member 1 are cut out at the rear ends so that the sidewall members 11, 12 extend from the top plate section 1a, at the cut-out parts, a shorter distance than at the mid and front parts so as to leave a void equal to the width of each of the locking members 9, 10. That is, the inner sidewall members 11, 12 clear the locking members 9, 10 held by the locking member holding sections 33, 34 while preventing these locking members 9, 10 from being detached upwards from the locking member holding sections 33, 34.

The retention members in the casing 100 for the disc cartridge according to the present invention may also be locking members 9, 10 shown in FIG. 44 in which the mid part of the bent arm 46 is flattened at 56, in place of the locking members 9, 10 shown in the preceding embodiment. This second modification of the casing for the disc cartridge according to the present invention is hereinafter explained.

The mid parts of these locking members 9, 10 are designed as retention means for being engaged in recesses 110, 109. When the disc cartridge 101 is introduced into the casing 100, the locking members 9, 10 are thrust by front lateral surfaces of the cartridge main body 102 for resiliently deflecting the bent arms 46. When the cartridge main body 102 is inserted up to a predetermined position inside the casing 100, the bent arms 46 are restored to their initial states for engaging the retention means in the recesses 110, 109. The locking members 9, 10, having the retention parts engaged in the recesses 109, 110, prevent the disc cartridge 101 from being disengaged from the casing 100 under sock or vibrations.

Since the retention parts of the locking members 9, 10 have flattened surfaces, these flattened surfaces 56 are slid against the cartridge main body 102 when the disc cartridge 101 is introduced into the casing 100 to assure smooth and easy insertion of the disc cartridge into the casing 100.

The retention members of the casing 100 may also be designed as locking parts 60 formed as one with the bottom plate member 2, instead of the locking members 9, 10 formed distinctly from the bottom plate member 2 shown in the preceding embodiments. This third modification of the casing for the disc cartridge is hereinafter explained.

These locking parts 60 are paired and formed at the inner rear surfaces of the outer sidewall members 17, 18 for facing each other. The locking parts 60 are formed at the lower portions of outer sidewall members 17, 18 as substantially plate-shaped members extended in the fore-and-aft direction. These locking parts 60, 60 have their front sides formed as one with the outer sidewall members 17, 18, with their rear ends being free ends. The locking parts 60 may be resiliently deflected in a direction towards the outer sidewall members 17, 18, with the front ends as fulcrum points, as indicated by arrow D in FIG. 48. The inner surfaces of the outer sidewall members 17, 18 are formed with clearances 61 in register with the locking parts 60 to permit resilient deflection of these locking parts 60.

The mid portions of these locking parts 60 are bent in a substantially trapezoidal shape directed towards the inside of the bottom plate section 2a. The mid portions of the locking parts 60 are formed as retention means engaged in the recesses 110, 109. When the disc cartridge 100 is introduced into the casing 100, the locking parts 60, 60 are resiliently deflected by being thrust by both front lateral sides of the cartridge main body 102. When the cartridge main body 102 is introduced up to a predetermined position within the casing 100, the locking parts 60 are restored to their original states to permit the retention means to be engaged in the recesses 110, 109. The locking parts 60, 60, having their retention means engaged in the recesses 110, 109, prevent the disc cartridge 101 from being disengaged from the casing 100 under shock or vibrations.

Figure 48:
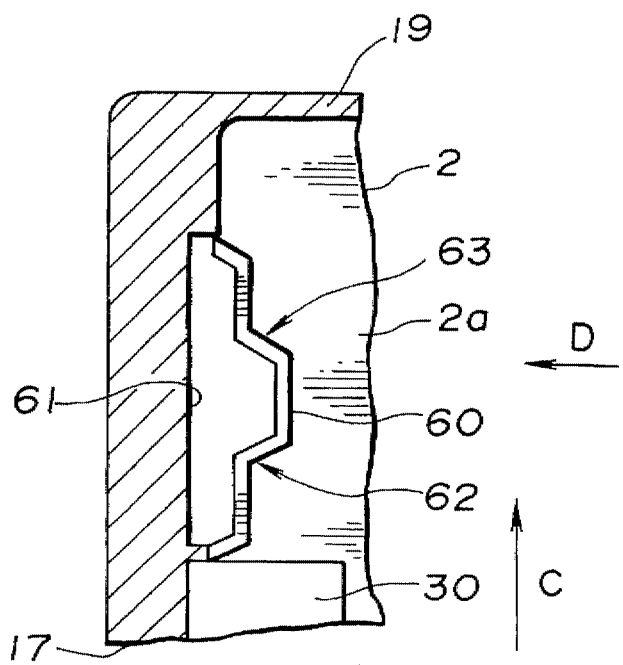
FIG. 48 is an enlarged partial plan view showing an arrangement of the locking member shown in FIG. 47.

The retention means of the locking part 60 has a front inclined surface 62 facing the inserting direction of the disc cartridge 101, shown by arrow C in FIG. 48. The front inclined surface 62 is sloped at a more moderate tilt than the opposite rear inclined surface in order to permit the locking parts 60 to be resiliently deflected more readily when introducing or taking out the disc cartridge 101 into or from the casing 100.

A fourth modification of the casing for the disc cartridge according to the present invention is hereinafter explained.

Figure 49:
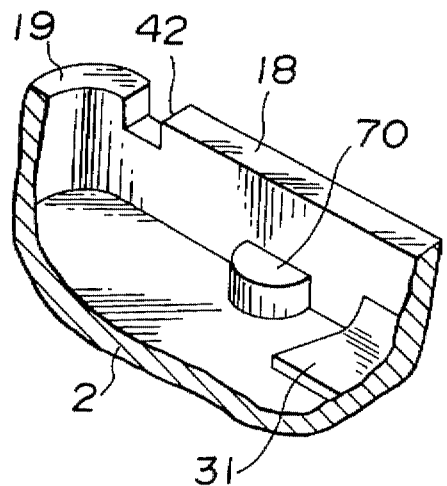
FIG. 49 is an enlarged perspective view showing the shape of essential part of the bottom plate member of the casing for the disc cartridge according of a fourth modification.
Figure 50:
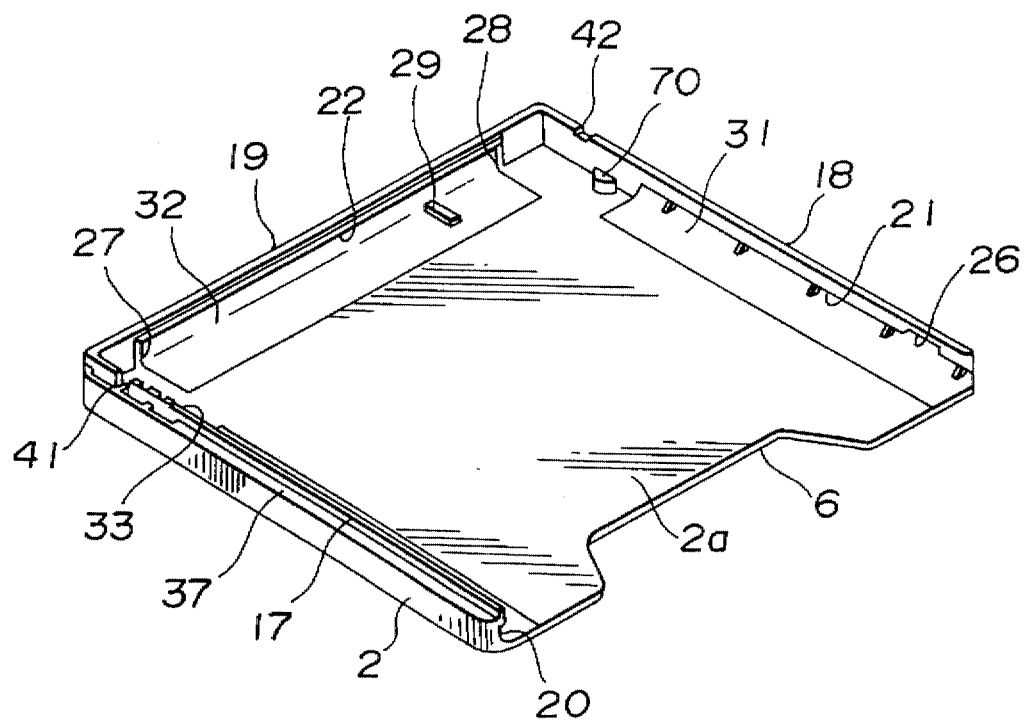
FIG. 50 is a perspective view showing the shape of the bottom plate member shown in FIG. 49.
Figure 51:
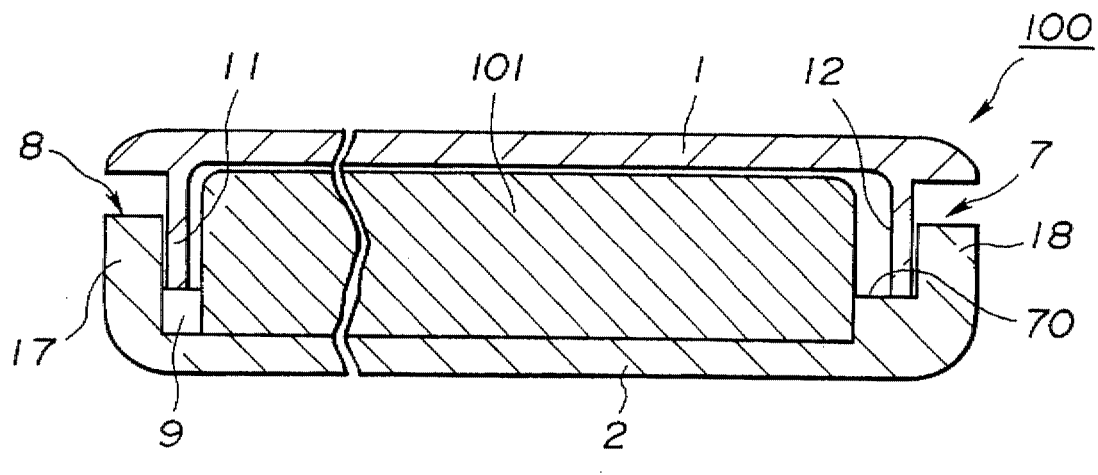
FIG. 51 is a longitudinal sectional view showing the state in which a disc cartridge is being insert, ed into the casing.
Figure 53:
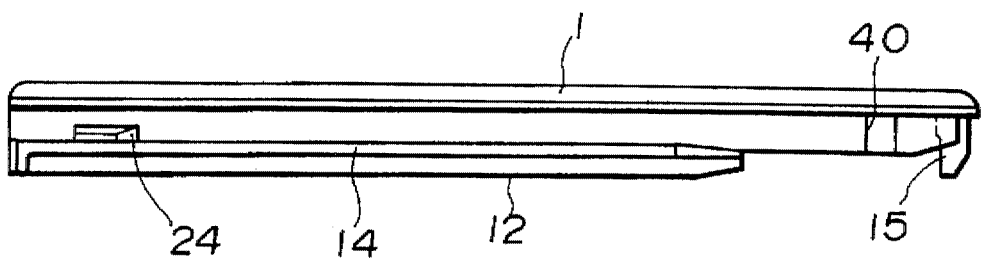
FIG. 53 is a side view showing the arrangement of a top plate member in a modification of the casing according to the present invention.

At the side of the locking member 9 in the interior of the casing 100, defined between the plate members 1 and 2, there is formed a locking boss 70, which is to be a retention boss, as shown in FIGS. 49 and 50. The locking boss 70 is formed as one with the bottom plate member 2. The locking boss 70 is provided at a rear portion of the outer sidewall member 18. The locking boss 70 is substantially semicylindrical-shaped and has its planar end face extending substantially parallel to the bottom plate section 2a and its semi-arcuate portion extending inwards from the lateral surface of the outer sidewall member 18. The inner sidewall members 11, 12 of the top plate member 1 are cut out at the rear ends so that the sidewall members 11, 12 extend from the top plate section 1a at the cut-out parts, a shorter distance than at the mid and front parts so as to leave a void equal to the width of the locking member 9 and a void equal to the height of the locking boss 70, as shown in FIG. 53. That is, the inner sidewall members 11, 12 clear the locking member 9 held by the locking member holding section 33 and the locking boss 70 while preventing the locking member 9 from being detached upwards from the locking member holding section 33.

For accommodating and holding the disc cartridge 101 by the casing 100 according to the above-described fourth embodiment, the disc cartridge 101 is introduced via the opening in the casing 100 from the front side, as shown by arrow A in FIG. 4, into a space between the top plate section 1a and the bottom plate section 2a.

Figure 52:
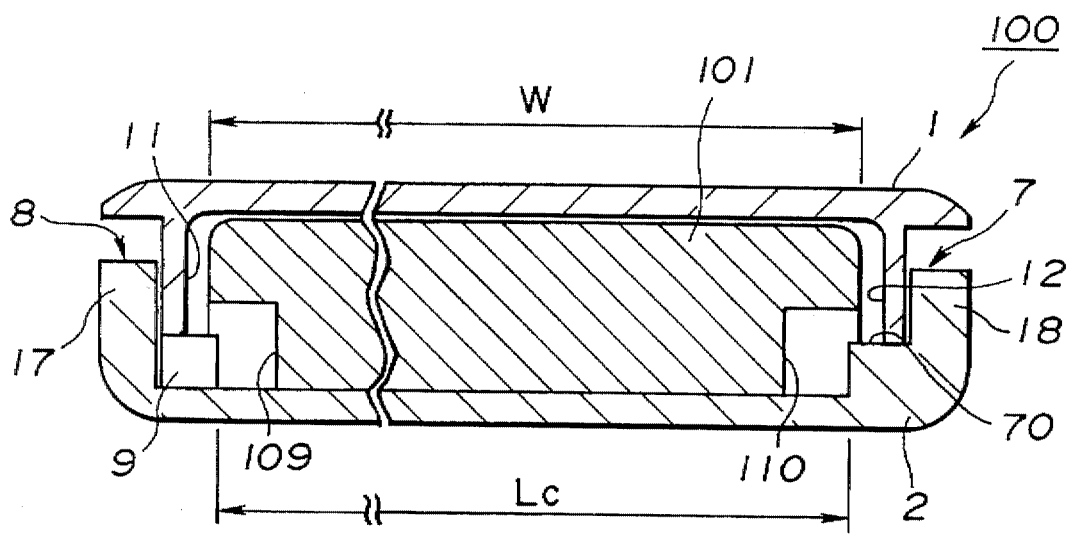
FIG. 52 is a longitudinal sectional view showing the state in which a disc cartridge has been inserted into the casing.

When the forward part of the disc cartridge 101 reaches the rear end of the casing 100, the forward end of the lateral surface of the cartridge main body 102 facing the locking member 9 thrusts the retention surface 47 of the locking member 9 for deflecting the arm 46 towards the outer sidewall member 17. At this time, the forward end of the opposite lateral surface of the cartridge main body 102 is caused to bear against the peripheral surface of the locking boss 70 so as to be shifted slightly towards the locking member 9. When the forward edge of the cartridge main body 102 is inserted up to a predetermined position in which it is substantially abutted against the inner sidewall section 15 of the casing 100, the locking member 9 and the locking boss 70 face the recesses 109, 110, respectively. The arm 46 of the locking member 9 is restored at this time to its initial state under its own resiliency, with the retention surface 47 being intruded into recess 109, as shown in FIG. 52. The locking member 9 thrusts the cartridge main body 102 towards the opposite side for introducing the locking boss 70 into the opposite side recess 110.

The distance between the apex of the retention surface 47 and that of the peripheral surface of the locking boss 70, indicated by arrow $L_c$ in FIG. 52, is selected to be smaller than the width of the cartridge main body 102, shown by arrow W in FIG. 52. Consequently, with the retention surface 47 of the locking member 9 and the locking boss 70 introduced into the recesses 109, 110, the cartridge main body 102 is retained by being clamped from both lateral sides and thereby prevented from being disengaged via the opening of the casing 100 towards the outside under shock or vibrations.

The mistaken insertion inhibiting protrusion 29 is engaged at this time in the disc type discriminating recess 111 of the disc cartridge 101.

The disc cartridge 101, thus accommodated in position within the casing 100, is contained between and protected by the plate members 1 and 2. For taking out the disc cartridge 101 out of the casing 100, the rear parts of the disc cartridge exposed to outside via cut-outs 5, 6 are pulled rearwards with respect to the casing 100. The locking member 9 then has its retention surface 47 thrust by the front part of the lateral surface of the cartridge main body 102 so that the arm 46 is flexed towards the outer sidewall member 17 to release retention of the cartridge main body 102. At this time, the disc cartridge 101 may be taken out of the casing 100 via the opening. If the disc cartridge 101 is moved further rearwards, the locking member 9 is reset to its initial state. The disc cartridge 101 may be taken out of the casing 100 by pulling the disc cartridge outwards.

Figure 57:
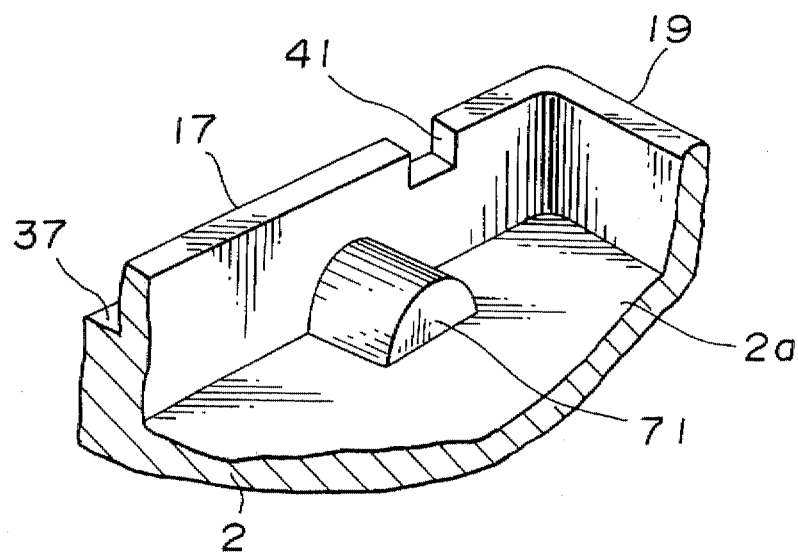
FIG. 57 is an enlarged perspective view showing the shape of essential parts of the bottom plate member shown in FIG. 54.
Figure 58:
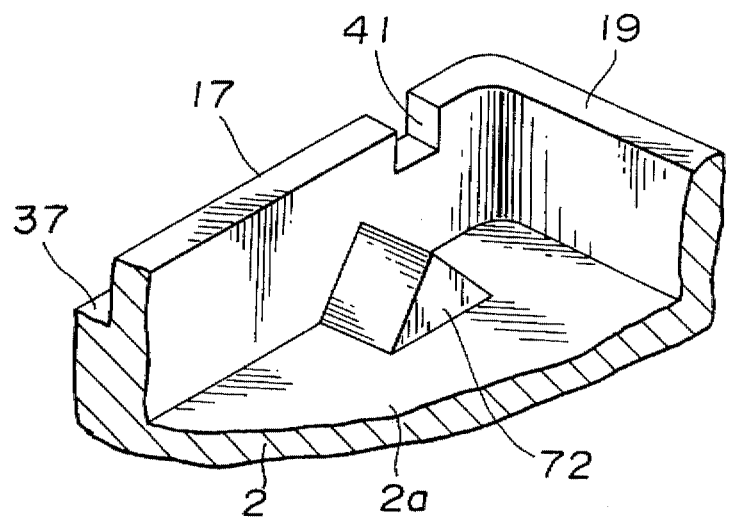
FIG. 58 is an enlarged perspective view showing a modification of the shape of essential parts of the bottom plate member shown in FIG. 54.

The casing 100 for the disc cartridge according to the present invention may also be provided with a pair of locking bosses 71, 71, as retention bosses, on both inner lateral surfaces of the main casing member, in place of the locking member 9 and the locking boss 70. These locking bosses 71, 71 are formed at rear parts of the outer sidewall members 17, 18 in opposition to each other. The locking bosses are formed as one with the outer sidewall members and with the bottom plate section 2a. These locking bosses 71, 71 are substantially semicylindrical-shaped and have their flat end faces parallel to the outer sidewall members 17, 18 while having the semi-arcuate peripheral surfaces extending upwards from the bottom plate section 2a, as shown in FIG. 57.

Figure 54:
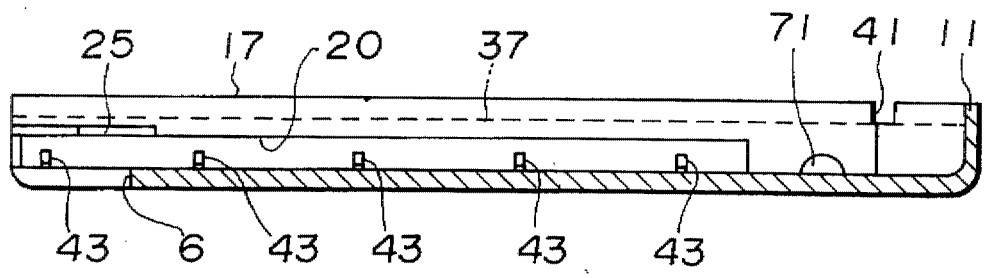
FIG. 54 is a side view showing the arrangement of a bottom plate member in another modification of the casing according to the present invention.
Figure 55:
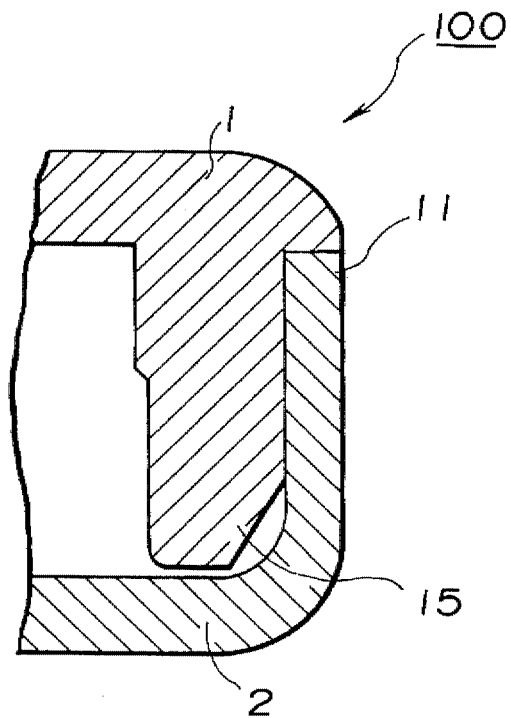
FIG. 55 is an enlarged partial cross-sectional view showing the engaged state at the rear side between the top plate member and the bottom plate member shown in FIGS. 53 and 54.

The present casing 100 is not provided with the flange 22 providing the rear engaging rib 16 and the rear engaging groove, with the outer lateral surface of the inner rear wall member 15 and the inner peripheral surface of the outer rear wall member 19 being planar, as shown in FIGS. 53 and 54. That is, with the lateral sidewall sections of the top plate member 1 and the bottom plate member 2 in engagement with each other, the rear wall members 15, 19 are caused to bear against each other and yet are movable vertically relative to each other.

Figure 56:
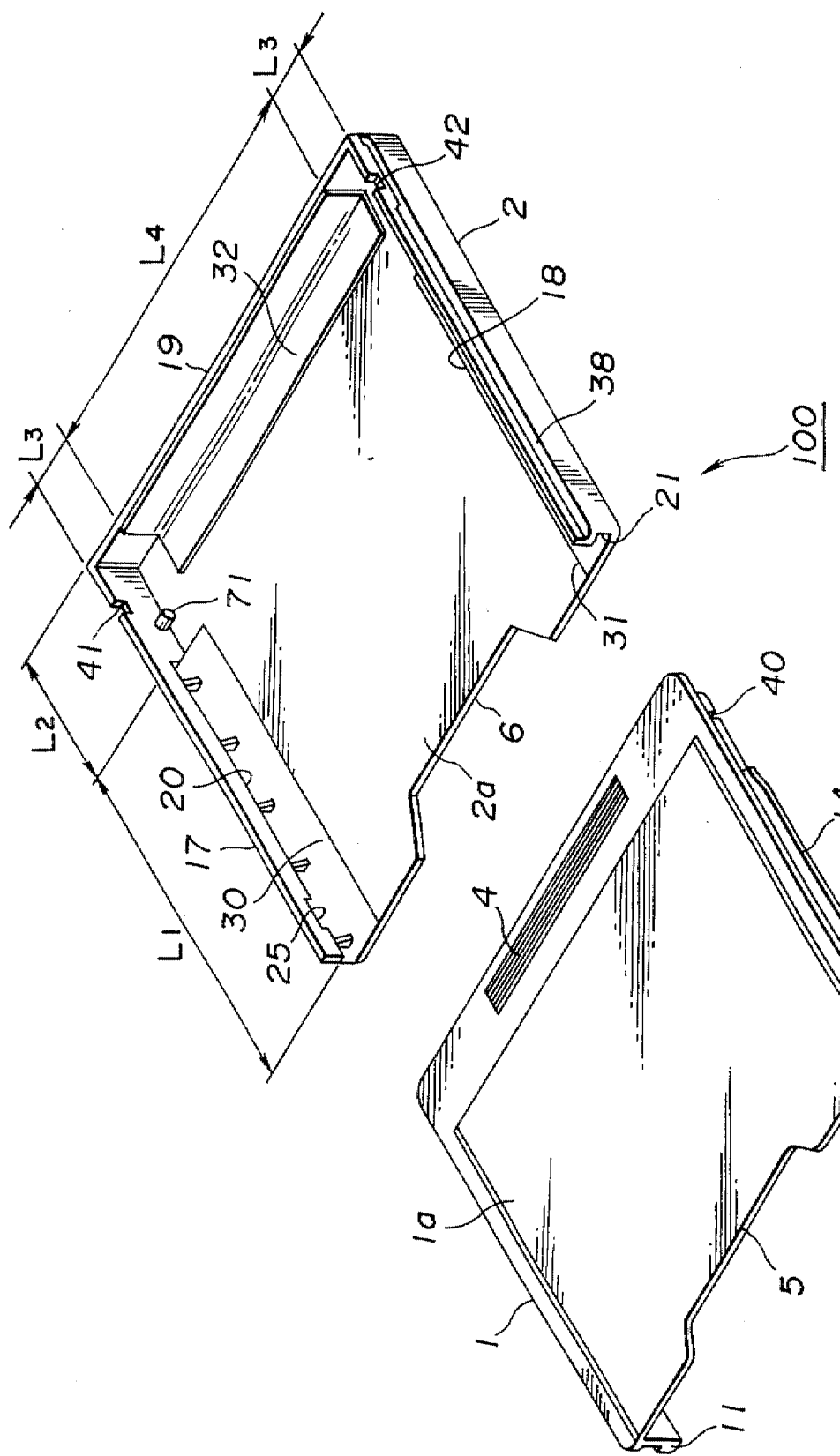
FIG. 56 is an exploded perspective view showing a disc cartridge constituted by the top plate member and the bottom plate member shown in FIGS. 53 and 54.

With the present casing 100, the sidewall sections 11, 12, 17, 18 are engaged at an area $L_1$ except a rear part $L_2$ as shown in FIG. 56. That is, with the present casing 100 for the disc cartridge, the rear parts of the top plate member and the bottom plate member are resiliently flexed in a direction away from each other. The rear wall members 15, 19 may also be engaged with each other at a central areas $L_4$ excluding both lateral side area $L_3$ in FIG. 56, in which case both lateral side areas of the top and bottom plate members may be resiliently flexed at the rear end portions in a direction away from each other.

When the disc cartridge 101 is introduced into the casing 100 such that the forward end of the disc cartridge 101 reaches the rear end of the casing 100, both front lateral sides of the bottom plate section of the cartridge main body 102 thrust the upper surface of the locking bosses 71, 71 for deflecting the bottom plate section 2a downwards, that is away from the top plate section 1a. At this time, the rear parts of the lateral grooves 7, 8 are widened from the initial state, as indicated by arrow C in FIG. 59. When the forward end of the cartridge main body 102 is introduced up to a predetermined position in which it is substantially abutted against the inner rear wall member 15 of the casing 100, the bottom plate section 2a is faced by the recesses 109, 110. The bottom plate section 2a is restored at this time under its own resiliency, as shown in FIG. 60, with the locking bosses 71, 71 being engaged in the recesses 109, 110.

Figure 59:
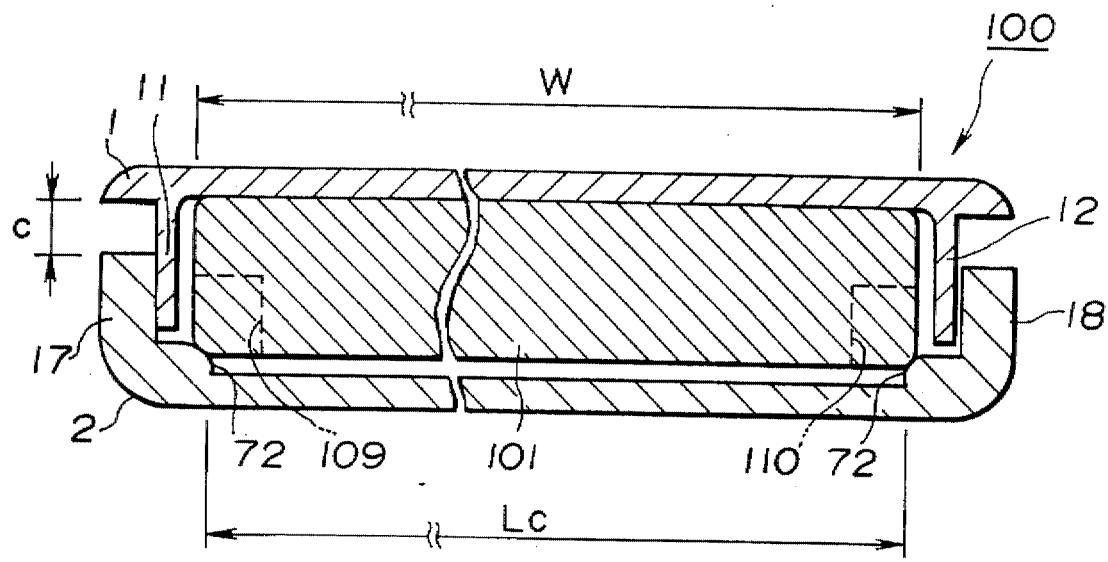
FIG. 59 is a longitudinal sectional view showing the manner in which the disc cartridge is being inserted into the casing shown in FIG. 56.
Figure 60:
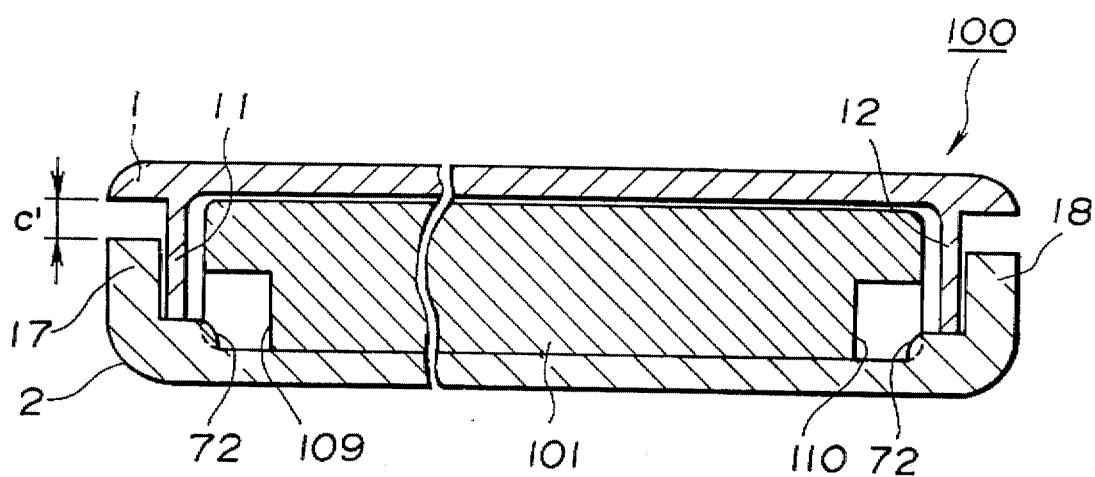
FIG. 60 is a longitudinal sectional view showing the manner in which the disc cartridge has been inserted into the casing shown in FIG. 56.

The distance between end faces of the locking bosses 71, 71 indicated by arrow $L_c$ in FIG. 59, is selected to be smaller than the width of the cartridge main body 102 indicated by arrow W in FIG. 52. Consequently, by having the locking bosses 71, 71 introduced into the recesses 109, 110, the cartridge main body 102 is retained by being clamped from both lateral sides and thereby prevented from being disengaged via the opening of the casing 100 towards the outside under shock or vibrations.

The disc cartridge 101, thus accommodated in position within the casing 100, is contained between and protected by the plate members 1 and 2.

For taking out the disc cartridge 101 out of the casing 100, the rear parts of the disc cartridge exposed to the outside via cutouts 5, 6 are pulled rearwards with respect to the casing 100. The locking bosses 71, 71 thrust by the front part of the lateral surfaces of the cartridge main body 102 so that the rear part of the bottom plate section 2a is deflected in a direction away from the top plate section 1a to release retention of the cartridge main body 102 by the locking bosses 71, 71. At this time, the disc cartridge 101 may be taken out of the casing 100 via the opening. If the disc cartridge 101 is moved further rearwards, the rear part of the bottom plate section 2a is returned to its initial state as compared with the top plate section 1a. The disc cartridge 101 may be taken out of the casing 100 by pulling the disc cartridge outwards.

If, with the present casing 100, a pair of locking bosses are formed at both inner lateral sides of the main casing member, these locking bosses may be substantially triangular-shaped with the triangular end faces extending parallel to the outer sidewall members 17, 18 and with upper ridges defined by inclined surfaces being protruded upwards away from the bottom plate section 2a.

A fifth modification of the casing for the disc cartridge according to the present invention is hereinafter explained.

Figure 61:
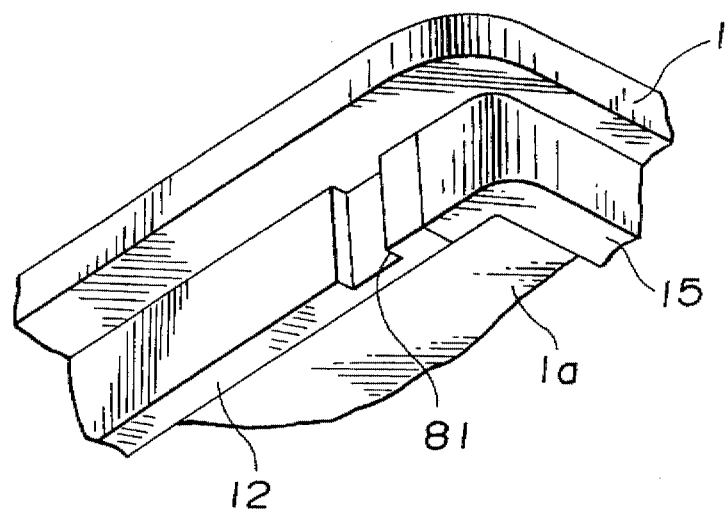
FIG. 61 is an enlarged partial perspective view showing essential part of the top plate member of the casing according to a fifth modification.
Figure 62:
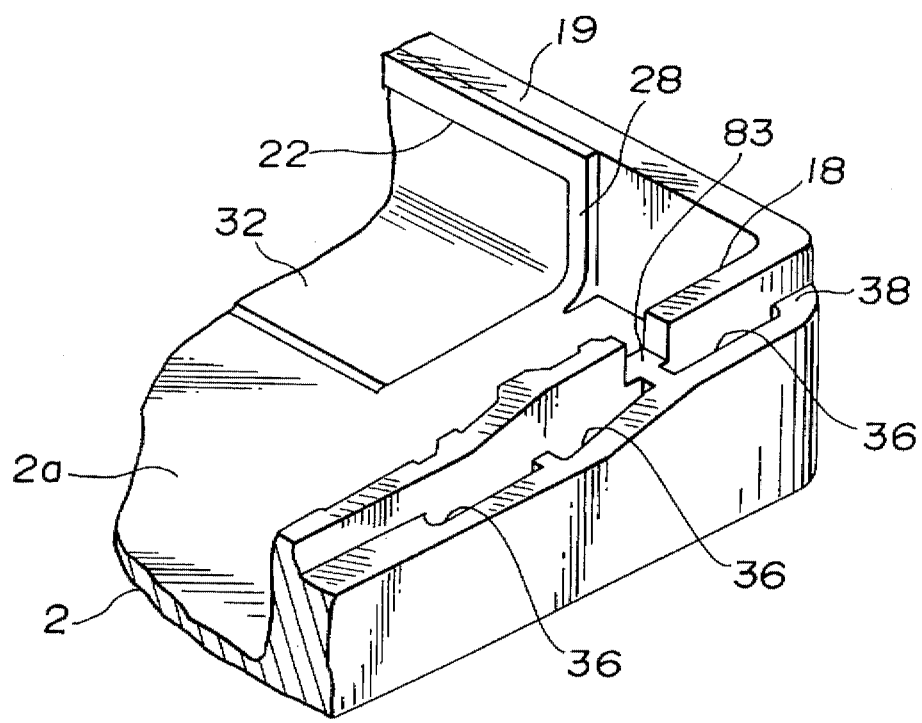
FIG. 62 is an enlarged partial perspective view showing essential part of the bottom plate member.

In the rear outer lateral surfaces of the inner sidewall members 11, 12 of the top plate member 1 are formed a pair of recesses 80, 81 defining bottomed holes. These recesses 80, 81 are formed as grooves extended vertically from the proximal sides up to the lower ends of the inner sidewall members 11, 12, that is from the lower surface of the top plate section 1a up to the vicinity of the lower ends of the inner sidewall members 11, 12, as shown in FIG. 61.

Figure 63:
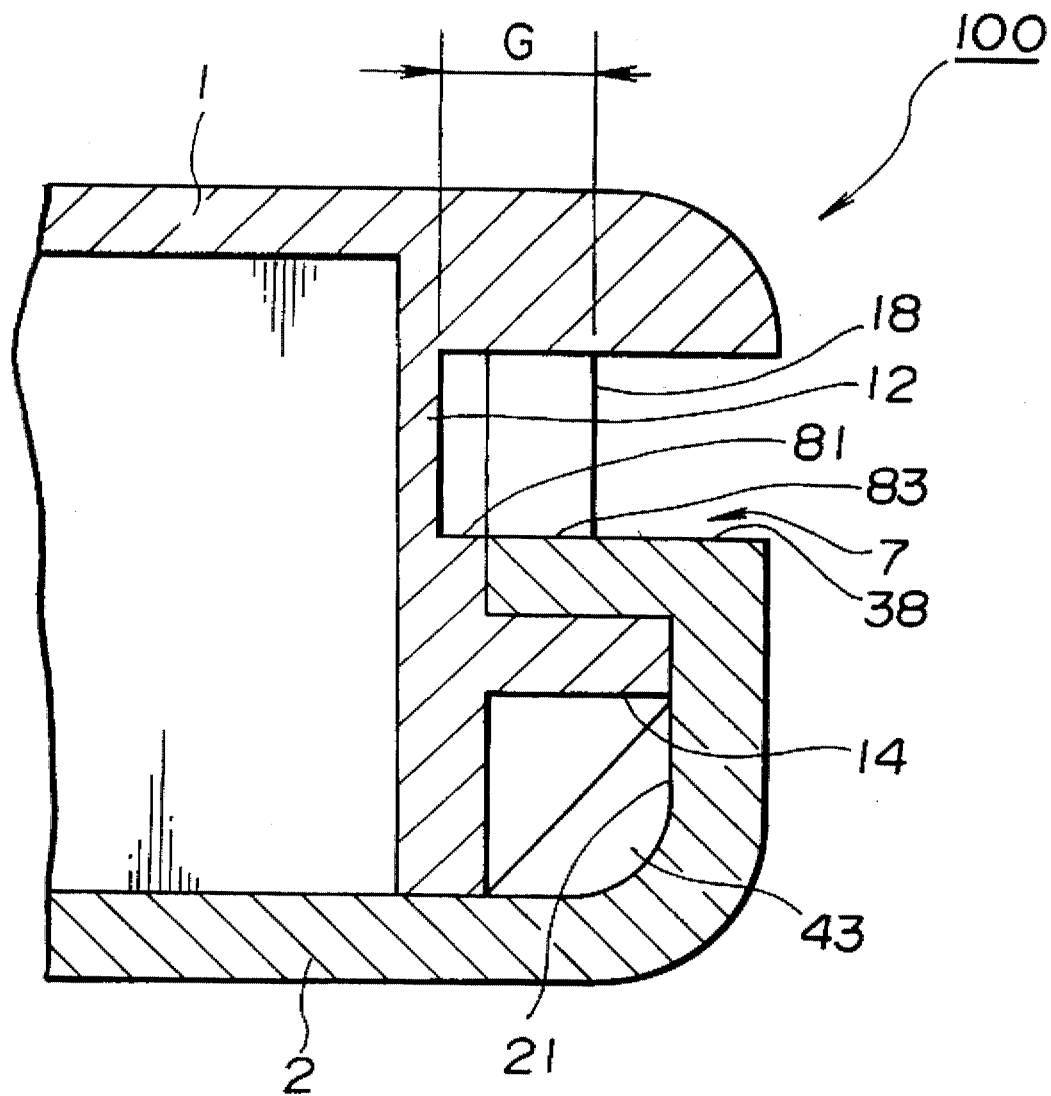
FIG. 63 is an enlarged partial longitudinal sectional view showing an arrangement of a bottomed hole of the casing for the disc cartridge.

In the rear parts of the outer sidewall members 17, 18 of the bottom plate member 2 are formed a pair of slits 82, 83 for defining a bottomed hole in register with the recesses 80, 81. These slits 82, 83 are formed in a direction from the upper ends towards the proximal ends of the outer sidewall members 17, 18, as shown in FIG. 63.

On the other hand, recesses 37, 38 formed on the upper ends of the outer lateral surfaces of the outer sidewall members 17, 18 and the vicinity of the lateral sides of the top plate section 1a define the above-mentioned lateral grooves 7, 8. That is, the upper sides of the outer sidewall members 17, 18 are caused to bear against the lateral sides of the top plate section 1a at positions offset inwards by a distance equal to the depth of the recesses 37, 38 as shown in FIG. 20. These lateral grooves 7, 8 are formed for extending from the front sides up to the rear ends of the lateral surfaces of the casing 100.

Into these lateral grooves 7, 8 are inserted supporting pieces of a rack, not shown, adapted for housing and supporting a plurality of the casings 100. That is, the above-described casing 100 is supported by the rack by means of the supporting pieces by having the supporting pieces introduced into the lateral grooves 7, 8.

On the rear side of the bottom portions of these lateral grooves 7, 8 are formed the bottomed holes which are defined by the slits 82, 83 in the outer sidewall members 17, 18 being superposed on the recesses 80, 81 in the inner sidewall members 11, 12.

These bottomed holes play the role of retaining the casing 100 by having engaging members of the rack engaged therein. These bottomed holes are of a depth sufficient to permit the engaging members to be engaged therein. The depth of the bottomed holes, indicated by arrow G in FIG. 63, corresponds to the depth of the recesses 80, 81 and the thickness of the outer sidewall members 17, 18 summed together, as shown in FIG. 63. Such depth is deeper than the thickness of the outer sidewall members 17, 18 or the thickness of the inner sidewall members 11, 12.

Figure 64:
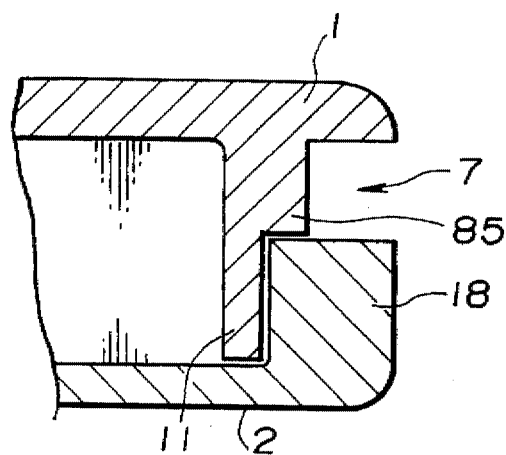
FIG. 64 is an enlarged partial longitudinal sectional view showing essential part of the top plate member of the casing according to a fifth modification.

A sixth embodiment of the casing for the disc cartridge according to the present invention is hereinafter explained. In the present modification, the lateral grooves 7, 8 are not limited to those defined by the top plate 1a and the recesses 37, 38, as in the preceding embodiment, but may be defined by the upper end faces of the outer sidewall members 17, 18, outer lateral surfaces of the inner sidewall members 11, 12 and by the vicinity of the ends of the top plate section 1a, in which case the inner sidewall members 11, 12 have the lower ends abutted against the bottom plate section 2a and are provided on their outer sides with step-shaped abutments 85, as shown in FIG. 64. The outer sidewall members 17, 18 are free of the recesses 37, 38 but are formed as planar upper end faces. The outer sidewall members 17, 18 have the upper lateral end portions abutted against the lower surfaces of the abutments 85, while being abutted against the outer lateral surfaces of the inner side wall members 11, 12 by their inner lateral surfaces.

Figure 65:
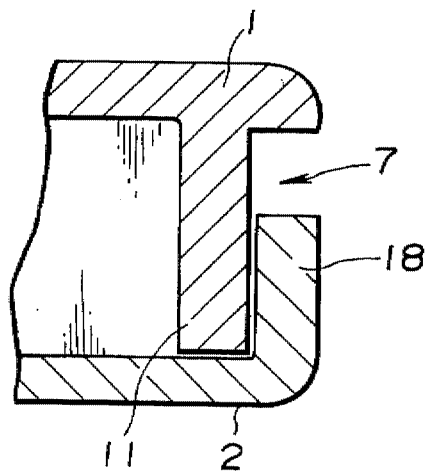
FIG. 65 is an enlarged partial longitudinal sectional view showing essential part of the top plate member of the casing according to a further modification.

If the lateral grooves 7, 8 are defined by the upper end surfaces of the outer sidewall members 17, 18, the outer lateral surfaces of the inner sidewall members 11, 12 and the vicinity of the ends of the top plate section 1a, the inner sidewall members 11, 12 may also be free of the abutments 85, as shown in FIG. 65. In such case, the outer sidewall members 17, 18 are caused to bear and support the lower end portions of the outer lateral surfaces of the inner sidewall members 11, 12.

Figure 66:
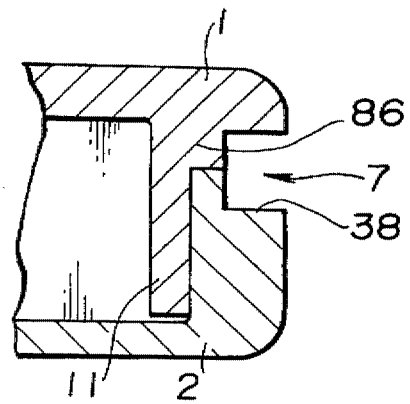
FIG. 66 is an enlarged partial longitudinal sectional view showing essential part of the top plate member of the casing according to a still further modification.

The lateral grooves 7, 8 may also be defined by the recesses 37, 38 formed on the upper ends of the outer sidewall members 17, 18, the outer lateral surfaces of the inner sidewall members 11, 12 and the vicinity of the end parts of the top plate section 1a, as shown in FIG. 66. In such case, the inner sidewall sections 11, 12 have their ends abutted against the bottom plate section 2a and are provided on their outer sides with step-shaped abutments 86. The outer sidewall members 17, 18 are formed with the recesses 37, 38. These outer sidewall members 17, 18 have their upper ends, that is the portions thereof offset more inwardly than the recesses 37, 38, abutted against the lower surfaces of the abutments 86. Besides, the outer sidewall members are abutted against and support the outer lateral surfaces of the inner sidewall sections 11, 12 by their inner lateral surfaces.

Figure 67:
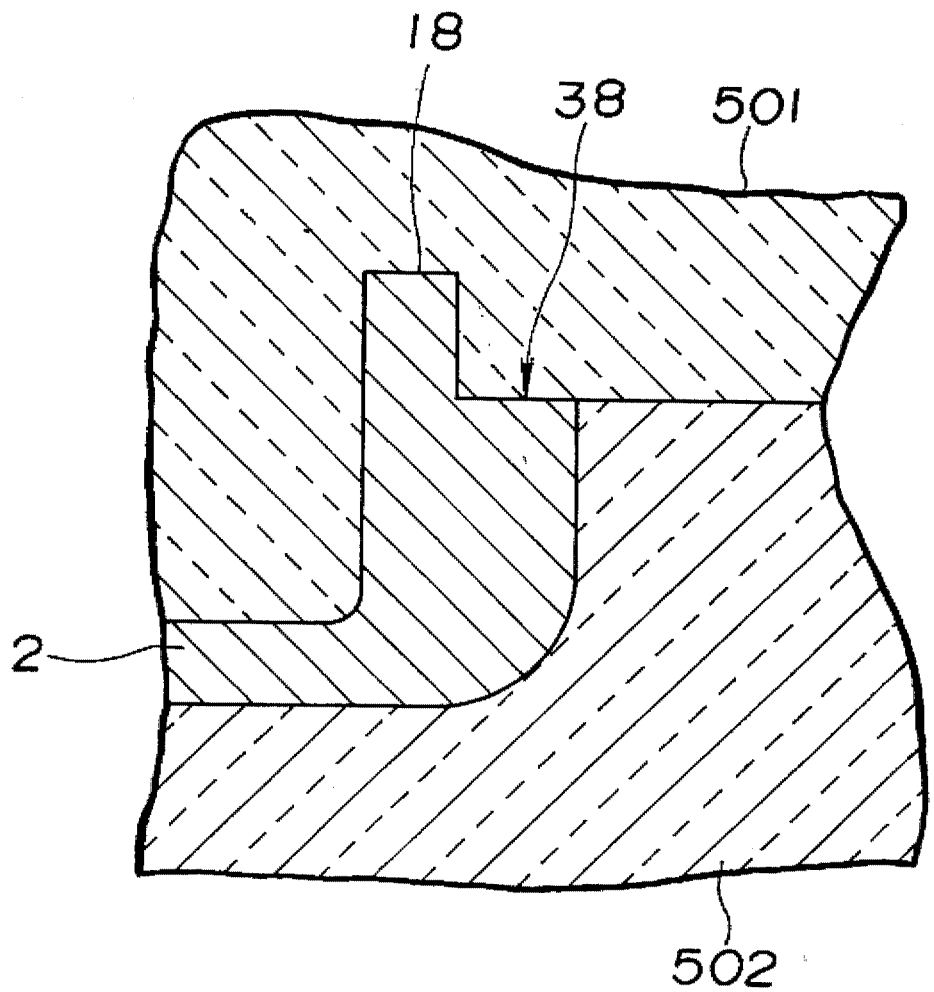
FIG. 67 is an enlarged cross-sectional view showing essential part of a metal mold for molding the top plate member and the bottom plate member.

Besides, since the recesses making up the lateral grooves 7, 8 are free of upwardly projecting parts, such as flanges, molding may be achieved by a metal mold of a simplified structure which is made up only of an upper mold 501 and a lower mold 502 and which is not provided with a slide core, as shown in FIG. 67.

With the present modification, high mechanical strength of the casing for the disc cartridge may be achieved since the lower ends of the inner sidewall members 11, 12 are abutted against the bottom plate section 2a, the upper ends of the outer sidewall members 17, 18 are caused to bear against the top plate section 1a and the outer sidewall members 17, 18 are caused to bear and support the outer lateral surfaces of the inner sidewall members 11, 12.

What is claimed is:

1. A packaging method for a casing having a top, a bottom, lateral sides and having an opening and a cut-out formed out of the top and bottom at the opening of the casing and a pair of grooves formed along each of the lateral sides of the casing, comprising the steps of covering at least said opening and said cut-out with a sheet-shaped member, applying heat shrinkable film around said casing so that overlapping portions are formed at offset positions from the grooves on the lateral sides of the casing, and heat-shrinking the film around the casing and fusing the ends of said film.

\* \* \* \* \*